(12) United States Patent
Doherty et al.

(10) Patent No.: US 6,874,665 B2
(45) Date of Patent: Apr. 5, 2005

(54) NOZZLE ASSEMBLY WITH A REUSABLE BREAK-OFF CAP A CONTAINER HAVING A NOZZLE ASSEMBLY AND PACKAGING THEREFOR

(75) Inventors: Michael A. Doherty, Foxford (IE); Peter C. Rushe, Celbridge (IE)

(73) Assignee: Loctite (R&D) Limited, Dublin (IE)

( * ) Notice: Subject to any disclaimer, the term of this patent is extended or adjusted under 35 U.S.C. 154(b) by 23 days.

(21) Appl. No.: 10/297,384

(22) PCT Filed: Jun. 7, 2001

(86) PCT No.: PCT/IE01/00078

§ 371 (c)(1),
(2), (4) Date: Dec. 6, 2002

(87) PCT Pub. No.: WO01/94213

PCT Pub. Date: Dec. 13, 2001

(65) Prior Publication Data

US 2003/0127472 A1 Jul. 10, 2003

(30) Foreign Application Priority Data

Jun. 7, 2000 (IE) .................................. 000463

(51) Int. Cl.⁷ .............................................. B65D 47/10
(52) U.S. Cl. ............................... 222/541.5; 222/541.6; 222/541.9; 215/48
(58) Field of Search ................... 222/541.5, 545–546, 222/541, 541.9, 562–563, 541.7, 107, 541.8, 209, 212, 541.6; 215/250, 258, 48; 220/266

(56) References Cited

U.S. PATENT DOCUMENTS

| 1,081,555 | A | * | 12/1913 | Russel, Jr. .................. 220/266 |
| 2,392,195 | A | * | 1/1946 | Shonnard ..................... 220/265 |
| 2,750,068 | A | * | 6/1956 | Platt, Jr. ...................... 220/265 |
| 3,187,966 | A | * | 6/1965 | Mindaugas ............... 222/541.2 |
| 3,204,835 | A | * | 9/1965 | Kenneth .................... 222/541.5 |
| 3,858,739 | A | * | 1/1975 | Turner et al. .................. 215/47 |
| 4,408,699 | A | | 10/1983 | Stock .......................... 222/149 |
| 4,408,700 | A | | 10/1983 | Filmore et al. .............. 222/153 |
| 4,413,753 | A | | 11/1983 | Stock .......................... 222/149 |
| 4,512,475 | A | | 4/1985 | Federighi ..................... 206/484 |
| 4,650,096 | A | | 3/1987 | Thatcher ...................... 222/153 |

(Continued)

FOREIGN PATENT DOCUMENTS

| CH | 676 109 A | 12/1990 | |
| DE | 197 12 334 | 10/1998 | ........... B65D/55/02 |

(Continued)

*Primary Examiner*—Gene Mancene
*Assistant Examiner*—Frederick C. Nicolas
(74) *Attorney, Agent, or Firm*—Steven C. Bauman

(57) ABSTRACT

The invention is a nozzle assembly (3, 20) with a re-useable break off cap (20) for dispensing a product from a container (1). On a dispensing end (5) of the nozzle (3) a break-off cap (20) is integrally formed thereon and closes off the dispensing end (5) of the nozzle (3). The break-off cap (20) is removable by breaking a frangible connection (22) between the nozzle (3) and the break-off cap (20). Removing the break-off cap opens the dispensing end (5) of the nozzle (3) thereby allowing product to be dispensed through the nozzle (3). The break-off cap (20) removed from the nozzle (3) can then be re-engaged with the nozzle (3) to close off the dispensing end (5) thereby preventing further product from being dispensed. The cap can be attached to or removed from the nozzle (3) as often as a user requires. The invention also includes packaging which includes a tray (111) or pouch into which the nozzle assembly (3, 20) and container (1) can be inserted. A flexible resealable peel-off cover (110) is provided on each tray (111) to allow a user to resealably open and close the tray (111). The resealable tray (111) can be provided either singly or as a series of trays.

31 Claims, 16 Drawing Sheets

U.S. PATENT DOCUMENTS

| | | | |
|---|---|---|---|
| 4,765,518 A | 8/1988 | O'Meara | 222/541 |
| 4,773,548 A | 9/1988 | Deussen | 215/2 |
| 5,076,474 A | 12/1991 | Hansen | 222/420 |
| 5,158,192 A | 10/1992 | Lataix | 215/32 |
| 5,228,593 A | 7/1993 | O'Meara | 222/41 |
| 5,238,157 A | 8/1993 | Gentile | 222/541 |
| 5,480,064 A | 1/1996 | Yan | 222/83 |
| 5,577,636 A | 11/1996 | Fukuoka et al. | 222/94 |
| 5,636,771 A | 6/1997 | Gordon et al. | 222/541.5 |
| 5,678,735 A | 10/1997 | Guglielmini | 222/153.06 |
| 5,722,568 A | 3/1998 | Smith | 222/153.06 |
| 5,826,737 A | 10/1998 | Zakensberg | 215/47 |
| 5,897,009 A | 4/1999 | O'Meara | 215/48 |
| 5,897,089 A * | 4/1999 | Lancaster et al. | 248/311.2 |
| 5,947,315 A | 9/1999 | Valyi et al. | 220/258 |

FOREIGN PATENT DOCUMENTS

| | | | |
|---|---|---|---|
| EP | 0 326 529 B1 | 12/1992 | B65D/69/00 |
| GB | 1 444 848 | 8/1976 | B65D/17/24 |
| GB | 2 006 712 A | 5/1979 | B65D/17/24 |
| GB | 2 120 630 A | 12/1983 | B65D/35/08 |
| WO | WO 00/00405 | 1/2000 | B65D/35/28 |

* cited by examiner

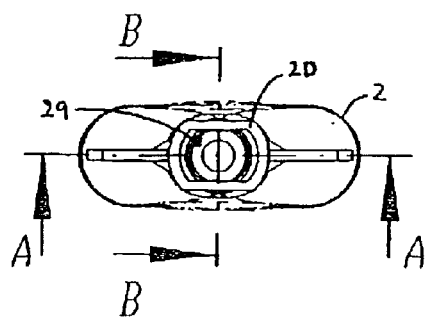
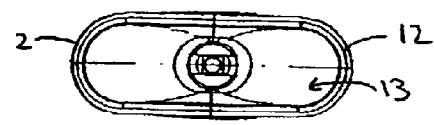
FIGURE 3
FIGURE 4
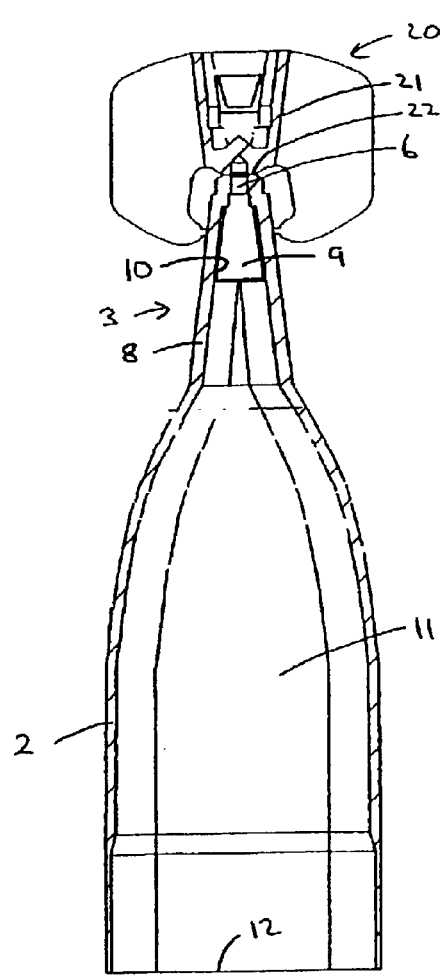
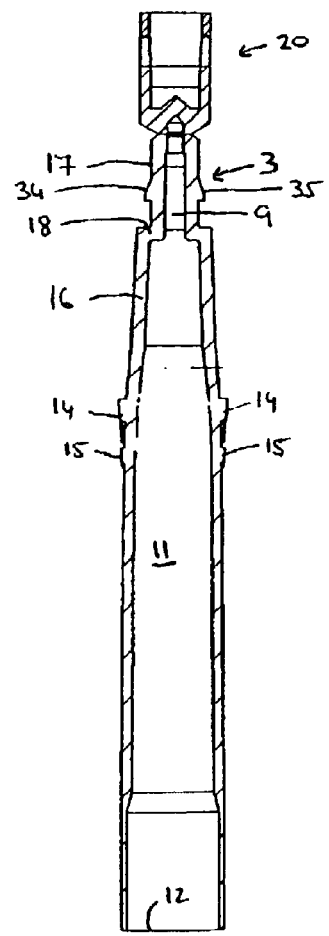
FIGURE 5
FIGURE 6

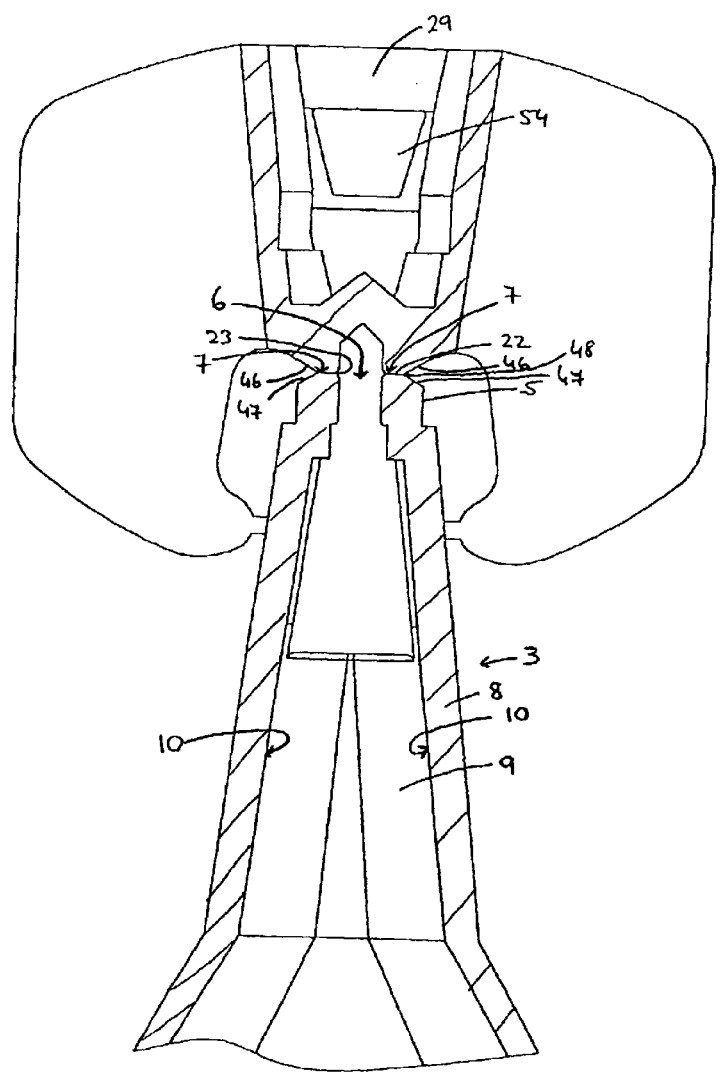
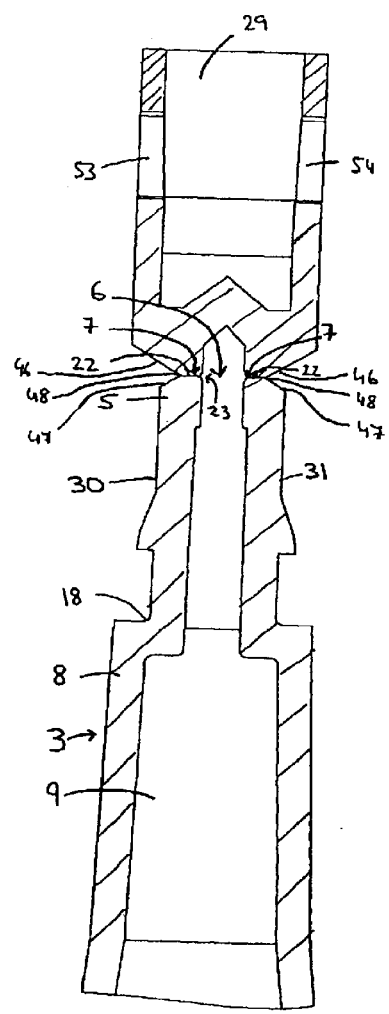
FIGURE 9
FIGURE 10

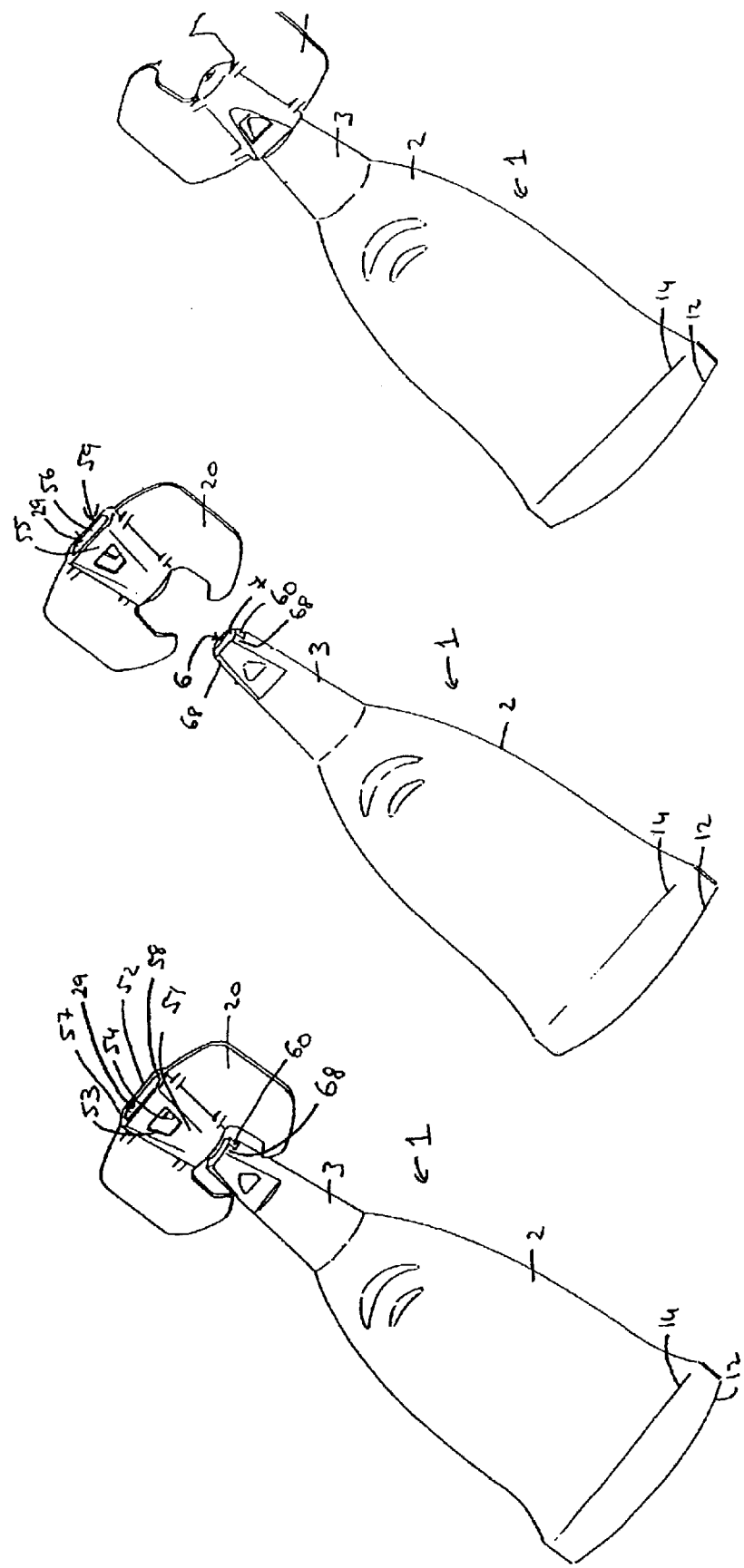

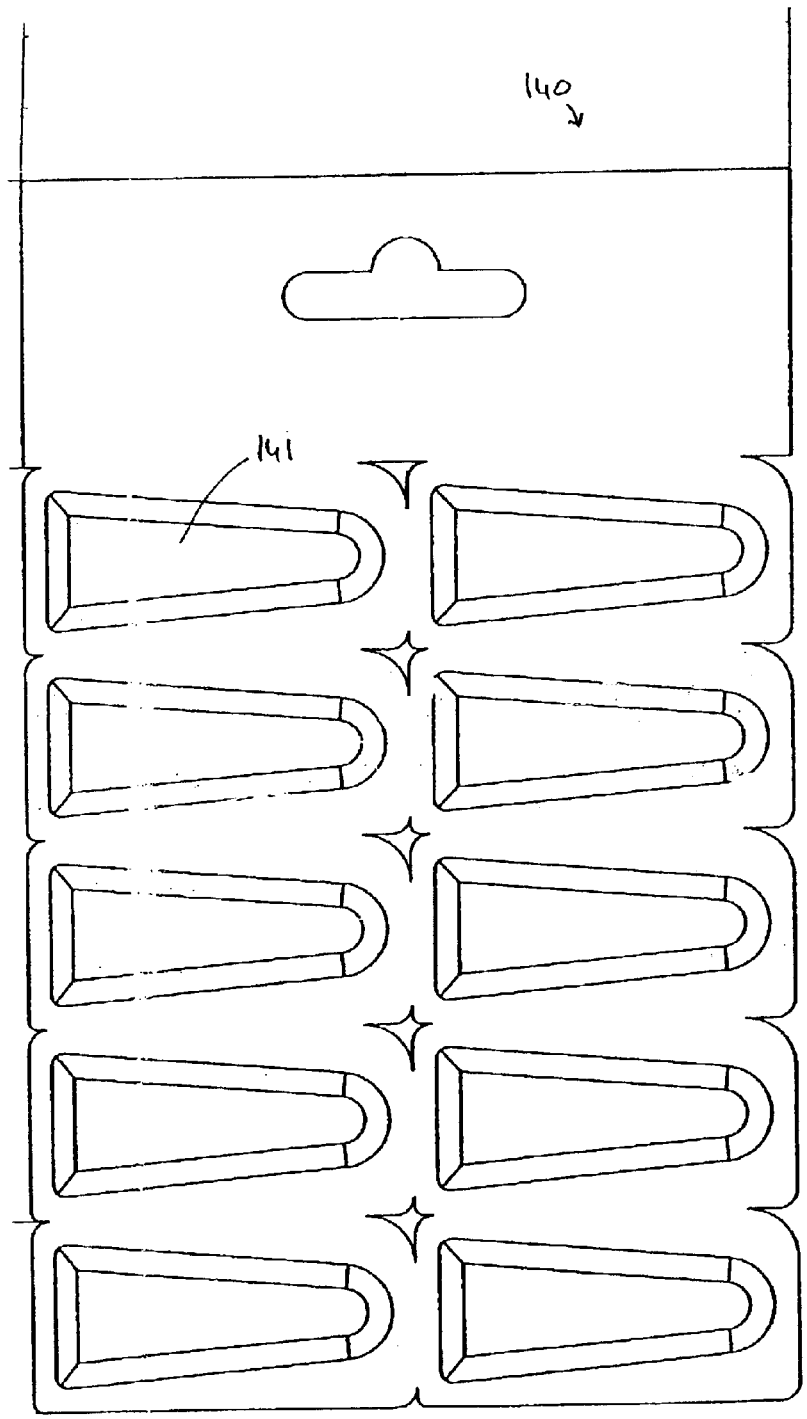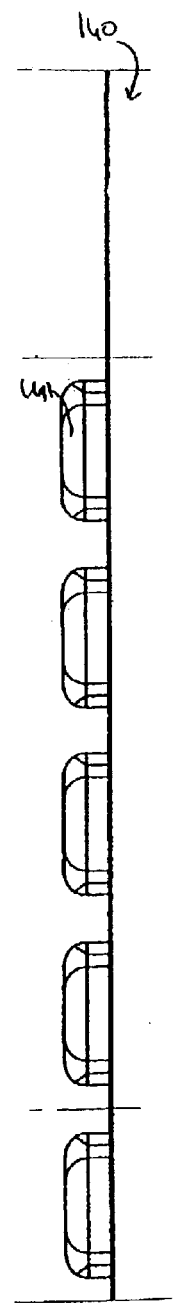
FIGURE 27
FIGURE 28

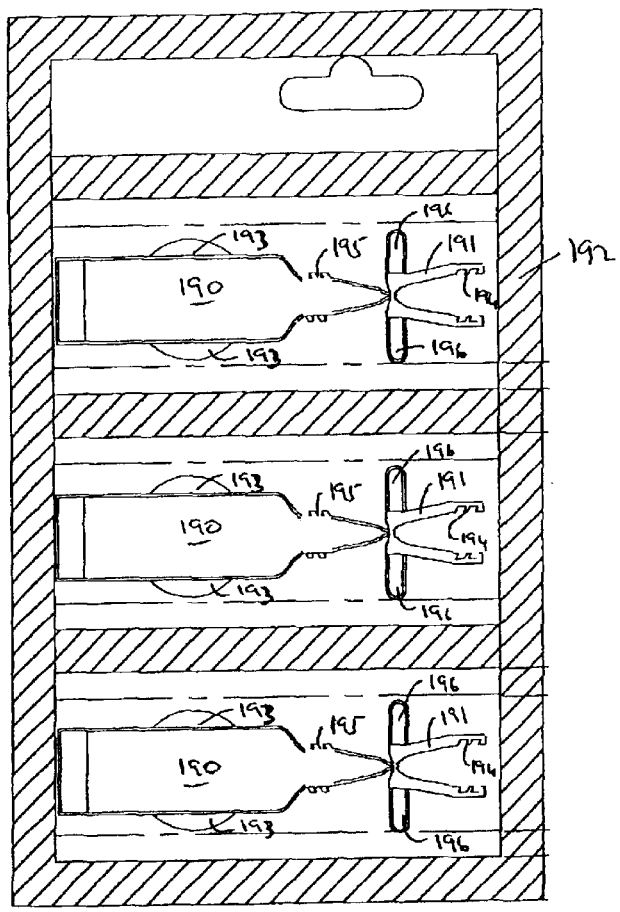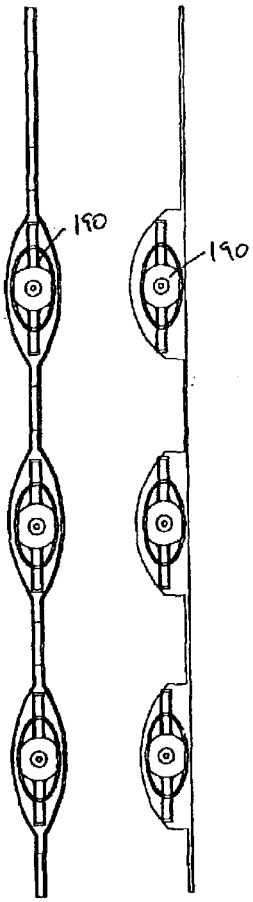
FIGURE 32
FIGURE 33
FIGURE 34

NOZZLE ASSEMBLY WITH A REUSABLE BREAK-OFF CAP A CONTAINER HAVING A NOZZLE ASSEMBLY AND PACKAGING THEREFOR

FIELD OF THE INVENTION

The present invention relates generally to the field of packs/packaging, and in particular dispensing packs/packaging. In particular the present invention relates to a dispensing nozzle assembly with a re-useable break-off (or break-away) cap. The nozzle assembly may be attachable to a container or integrally formed therewith. The nozzle may thus be closed with the cap after the cap has been broken off. The nozzle may be attachable to or integrally formed with a container and the containers contents are thus protectable by the re-useable cap.

BACKGROUND TO THE INVENTION

It is desired to provide inexpensive re-useable dispensing packs which offer the user the opportunity to partially dispense the contents of a container and store the remainder for later use. The user can dispense as much of the contents as required and then re-close (or reseal) the pack to store the contents for a future use. Re-sealing the pack is important particularly for materials which are sensitive to their environment for example products which are air, moisture, light sensitive etc.

Many re-closeable packs are known. In general these may be complex to manufacture and require removable caps etc. which allow the container to be re-sealed after a use. On the other hand it is known to provide single use or "one shot" disposable pack which once opened cannot be subsequently closed. This form of pack is usually a tear- or break-open pack. The advantage of a one shot pack is its relatively inexpensive manufacture as compared to re-closeable or re-sealable packs. The disadvantage of such containers is of course that the contents are intended to be used all at once. If not all the product is used at one time, there is a difficulty in storing the pack as it is not closed and the contents may spill. The life of the remaining product may also be compromised particularly as stated above where the product is sensitive to environmental factors.

It is also possible to provide low cost tubes, for instance a tube constructed of aluminium or other such metal or plastics materials. Such tubes are often provided with screw-on, snap-on, or otherwise engageable nozzles. The nozzle is usually provided to help accurate dispensing of the contents of the tube. These nozzles are often provided with separate screw-on caps to close the dispensing nozzle to protect the product. The nozzle and the cap are separately provided and the cap is screwed onto the nozzle. In order to use the dispensing nozzle it is firstly screwed onto the tube. A dispenser with dispensing means for dispensing the contents of the tubes is known for example from WO 00/00405. The device is provided with a nozzle which screws onto the tube and a cap which screws onto the nozzle. The device of WO 00/00405 may be used with a nozzle assembly or container of the present invention. Alternatively a container with an integrally formed nozzle may be provided. Containers with integrally formed dispensing nozzles are also often deformable (squeezable).

There exists a requirement for a low cost multi-use pack.

A further problem in providing a reusable container or nozzle assembly with a break-off cap is difficulty in re-closing the container/nozzle to provide a reliable seal to protect the contents of the container. It is difficult to provide low cost containers/nozzles which close after use to provide a reliable seal. Creating a reliable seal necessitates accurate mating of the surfaces forming the seal. This in turn requires careful manufacture with precise engineering of the product which may be reflected in increased cost in production. Generally components which mate to provide a seal are manufactured separately and with great precision so that the subsequent making of the components provides the desired seal.

Difficulty of re-closure is especially acute with break-off caps. Break-off caps are frangibly connected to the container which they close. Breaking the frangible connection between the break-off part (usually the cap) and the container may leave remnants of the frangible connection on the break-off part or on the container. These remnants may interfere with subsequent re-fitting of the break-off part to the container thus making proper re-closure of the container difficult, with possible ensuing detriment to the useable life of the product within the container. As stated above there are certain types of products which particularly need protection from the general environment. Of particular concern in the present case are curable products, in particular adhesives.

EP 0 326 529 describes a strip of phials. The document is concerned with the problem of handling of relatively small phials, and proposes a strip or web of phials which are more easily handled mechanically. Each phial is a small squeezable container with an integrally moulded nozzle and cap on the container. The cap is a break-off cap and the containers are intended to be single use "one shot" containers.

Loctite (Ireland) Limited sells a product called Indermil™ which is a surgical adhesive. The product is presented for sale in individual phials similar in construction to the phials disclosed in EP 0 326 529 discussed above. The phial has a hollow container body for receiving and holding product placed in the container. The hollow container body has an outlet nozzle, through which the product is dispensable. The outlet nozzle has a first intake end which projects from the container body and is integrally formed therewith. The nozzle has a second dispensing end with a dispensing opening formed in the dispensing end and a mouth formed on the nozzle about the dispensing opening. The nozzle of the device has a nozzle body with a conduit defined therein and bounded by an internal surface of the nozzle body, the conduit in communication with the container body and the dispensing opening. The phial has a break-off cap comprising a cap body for closing the dispensing end of the outlet nozzle, the break-off cap having a first position wherein the cap body is integrally formed with the outlet nozzle to close the outlet opening of the outlet nozzle and is connected thereto by at least one frangible connection, and a second position wherein the frangible connection is broken allowing removal of the cap and thus opening the outlet opening thereby allowing product to be dispensed from the container. The cap once removed may be inverted and repositioned on the container by push-fit (frictional) engagement of the cap and the nozzle. It is desired to provide an alternative nozzle assembly for use with a container which can be used to store materials. In order to improve the useful life of products stored in containers it may be desirable to provide an outer (protective) packaging which may help improve storage stability, particularly one that is convenient for point of sale display.

OBJECT OF THE INVENTION

An object of the present invention is to provide a low cost multi-use pack. In particular it is desired to provide a pack which is suitable for storage of environment sensitive products such as adhesive and other curable products. It is also an object of the invention to provide an outer packaging for such containers.

SUMMARY OF THE INVENTION

A first aspect of the present invention provides a nozzle assembly comprising:
- a) an outlet nozzle for dispensing product, having a first intake end for taking up product from a container and a second dispensing end with a dispensing opening formed in the dispensing end and a mouth formed on the nozzle about the dispensing opening, the nozzle comprising a nozzle body with a conduit defined therein and bounded by an internal surface of the nozzle body, the conduit for communication between the intake end of the nozzle and the dispensing opening; and
- b) a break-off cap comprising a cap body for closing the dispensing end of the outlet nozzle, the break-off cap having a first position wherein the cap body is integrally formed with the outlet nozzle to close the dispensing opening of the outlet nozzle and is connected thereto by at least one frangible connection, and a second position wherein the frangible connection is broken allowing removal of the cap and thus opening the dispensing opening thereby allowing product to be dispensed through the outlet nozzle;
- the nozzle assembly having an internal annular crotch, which narrows in a radially outward direction, formed between the nozzle and the cap body about the dispensing opening, the crotch providing a weakened junction between the cap and the nozzle allowing the cap to be broken off from the nozzle thus breaking the frangible connection.

In a second aspect the present invention provides a nozzle assembly comprising:
- a) an outlet nozzle for dispensing product having a first intake end for taking up product from the container and a second dispensing end with a dispensing opening formed in the dispensing end and a mouth formed on the nozzle about the dispensing opening, the nozzle comprising a nozzle body with a conduit formed therein defined by an internal surface of the nozzle body, the conduit for communication between the intake end and the dispensing opening; and
- b) a break-off cap comprising a cap body for closing the dispensing end of the outlet nozzle, the break-off cap having a first position wherein the cap body is integrally formed with the outlet nozzle to close the dispensing opening of the outlet nozzle and is connected thereto by at least one frangible connection, and a second position wherein the frangible connection is broken allowing removal of the cap and thus opening the dispensing opening thereby allowing product to be dispensed through the outlet nozzle;
- the cap body and the outlet nozzle having interengaging formations for subsequently securing the break-off cap to the nozzle body to close the outlet opening.

In a third aspect of the present invention the first and second aspects of the invention may be combined in a single nozzle assembly. This combined nozzle assembly is particularly useful to provide re-useable containers. The nozzle assembly combining the features of the first and second aspects allows for ease of removal of the cap from the nozzle and also subsequent re-fitting of the cap to the nozzle.

It is particularly desirable that the nozzle (and thus the nozzle assembly) forms an integral part of the container, though as explained above the nozzle assembly may be adapted to engage on an existing container, for example by snap-fitting or screw-threading.

The (internal) annular crotch allows for ease of removal of the cap as the apex of the crotch runs toward (and preferably meets) the frangible connection so that resistance to breaking off is not so great as it might otherwise be. The annular crotch may thus be considered inside, or interior to the frangible connection. There is less of a tendency for the remnants of the frangible connection to remain on the nozzle, thus facilitating ease of subsequent re-closure of the nozzle. There is thus provided a weakened junction (or a circumferential line of weakness) between the cap and the nozzle.

The crotch may be generally v-shaped being defined on one side by a surface of the cap body and on the other by a surface of the nozzle. The surfaces defining the cap may diverge in a radially inward direction. In the radially outward direction the surfaces of the crotch may converge toward the frangible connection to (a point of convergence to) form the apex of the v-shape. At the apex the nozzle and the cap are frangibly connected.

The surface on the nozzle defining one side of the crotch may run from the internal surface of the nozzle, or from a position proximate to the internal surface of the nozzle to the mouth of the nozzle. The annular crotch is thus internal to the nozzle/cap arrangement.

In one particularly simple though desired construction one side of the internal annular crotch is provided, at least in part, by a ramped surface running from the internal surface of the nozzle defining the conduit to the mouth of the nozzle. The ramped surface is desirably annular. In one arrangement the annular ramped surface is of a generally frusto-conical shape (narrowing in diameter downwardly) for example gradually decreasing in diameter from the mouth of the nozzle to the surface defining the conduit. This embodiment allows for ease of re-closing the container with a reliable seal as will be described below.

To further ensure ease of removal of the cap from the nozzle the nozzle assembly is desirably provided with an external annular crotch, which narrows in a radially inward direction, formed between the nozzle and the cap body about the dispensing opening, the external crotch providing a weakened junction (exterior to the frangible connection).

As with the (internal) annular crotch described above, the external crotch may be generally v-shaped being defined on one side by a surface of the cap body and on the other by a surface of the nozzle. The surfaces defining the cap may diverge in a radially outward direction. In the radially inward direction the surfaces of the crotch may converge toward the frangible connection to form the apex of the v-shape. At the apex the nozzle and the cap are frangibly connected.

The surface on the nozzle defining one side of the external crotch may run from an external (side) surface of the nozzle, to a position on the nozzle proximate or at the mouth of the nozzle.

Typically the frangible connection is formed by plastics material during moulding of the container of the invention from plastics material.

The provision of the internal annular crotch allows for particular clean break-off of the cap. Clean surfaces (surfaces without remnants of the frangible connection) are left about the nozzle mouth so that subsequent re-closure of the nozzle (and thus the container) is facilitated. Good mating of the cap and nozzle surfaces help to protect product within the container from environmental influences.

A container according to the second aspect (or third aspect) of the present invention is thus provided with a re-closeable cap which is easily re-fitted to the nozzle (container) to provide a reliable seal. The container and the nozzle assembly can be moulded as a single piece for example from plastics material, thus making an integrally formed container which is relatively low cost to produce.

A container having a nozzle assembly according to any aspect of the present invention is desirably a hand-held phial. The phial may be constructed of deformable plastics so that it may be squeezable (by manual pressure and in particular finger pressure) to express product. Optionally the phial may be constructed of clear or translucent plastics. The plastics material can be sufficiently translucent to allow the level of product within the container to be determined by external viewing (through the sides of the container).

The interengaging formations may for example be screwthreads. Alternatively the interengaging formations may be snap-fit formations. In one desirable arrangement the interengaging formations are snap-fit formations that are disengageable from the interengaged position by relative rotation of the cap and the nozzle. Where the nozzle is on, or is integrally formed with a container, this will also occur where the cap and the container are rotated relative to each other. It is desirable that the interengaging formations snap-fit to hold the cap to the nozzle and/or container, and yet, allow twisting off of, the cap, from the nozzle and/or container. This arrangement allows for particular ease of the replacement and removal of the cap, on or from the nozzle (container).

The break-off cap is desirably held in an inverted position on the outlet nozzle before it is broken off. In this arrangement an outer surface of the cap closes the dispensing opening on the nozzle (which may in turn be connected to an outlet opening on the tube). This is an especially simple construction. Suitably the outer surface of the cap closing the dispensing opening is an internal wall of a recess or housing formed on the cap the housing mating with the mouth of the nozzle. This arrangement ensures unwanted plastics material produced during moulding does not inadvertently interfere with the dispensing opening.

The break-off cap is desirably reversible so that when broken off, the cap may be inverted for replacement on to the nozzle (container). In this embodiment it is desirable that the cap body comprises a housing for receiving the outlet nozzle, the formations for interengaging with the reciprocal interengaging formations on the nozzle or on the container being formed on the housing desirably internally. In this embodiment an inner surface of the cap (a surface within the housing) closes the outlet opening. This embodiment is particularly advantageous as if remnants of the frangible connection remain on the cap, after the cap has been broken off, then the remnants will be on the exterior of the cap (in the closed position of the cap). The remnants cannot then interfere with closure. This arrangement ensures also that a proper seal is formed between the cap and the nozzle so that when the filling process is completed though the open base end of the container, and the base of the container sealed, the entire container is sealed by an integrally formed body. No concerns about proper securing of the cap on the nozzle/container then arise.

The interengaging formations may be formed by one or more projections and one or more corresponding recesses or grooves with which the projections engage. The projections and the grooves/recesses may be located respectively on the nozzle and on the cap or vice versa. This arrangement may provide for snap-fit engagement of the cap on the nozzle/container.

Desirably the cap has a discharge opening engaging portion for closing the dispensing opening. This may be a projecting portion on the underside of the cap which at least partially projects into the dispensing opening of the nozzle. This is a desirable construction as the projecting portion may help to provide a reliable seal between the cap and the nozzle. Where the internal annular crotch is provided, at least in part with a ramped surface, the projecting portion is desirably shaped to mate. When the ramped surface is of a generally (inverted) frusto-conical shape it is desired that the projecting portion is shaped to mate, for example of a conical or frusto-conical shape. This arrangement allows for ease of reclosure of the cap. In one highly desired embodiment the projecting portion is conical in shape.

In one particularly advantageous construction the nozzle is oblong in cross section and the cap is correspondingly shaped (for mating of the nozzle and the cap) so that relative rotation of the cap and the nozzle/container causes deformation of the cap and allows for its removal. The cap and nozzle can be said to be irregularly shaped i.e. their shapes do not allow for relative rotation without deformation of at least the cap taking place. Where snap-coupling means are provided deformation of the cap desirably disengages the snap-coupling means allowing for removal of the cap. One way to achieve this function is to provide a nozzle which is oblong in cross-section and which has a four sided configuration so that in cross-section it has two opposing substantially flat sides and two opposing curved ends. The cap may taper (narrow) towards its top end to correspond to the shape of the nozzle. When a cap is provided with reciprocal (for example an over-fitting) shape relative rotation of the nozzle and the cap will cause deformation of the cap and/or the nozzle/container. It is desired that for the most part it is the cap which deforms on relative rotation. In this construction the snap-fit engagement means may be provided on the flat sides of the nozzle (and on the corresponding sides of the cap) so that the cap can be relatively easily removed from the container by relative rotation of the cap and the container.

Desirably the nozzle and the cap have co-operating guiding surfaces which guide the cap toward a desired orientation relative to the nozzle. In particular it is desired for aesthetic, handling, packaging and other purposes that the cap and the nozzle/container have a certain alignment. For instance where the cap and the container are flat in shape it may be desired to align the cap with the container so that the cap remains in line with the container body. This can also ensure that the cap is correctly seated on the nozzle. In one desired construction the guiding surfaces will align the cap on the nozzle if the cap and nozzle are within about 45° of the desired alignment. The guiding surface may be a seat and a corresponding seat-engaging portion. The seat may be a recess on the nozzle into which a projection (on the cap) fits. That part of the nozzle or the cap forming the seat may also provide one or more stops to prevent incorrect alignment of the cap and the nozzle/container. This arrangement is particularly desirable, where otherwise, the cap and the nozzle could be forced together in an undesired orientation.

The invention provides in a fourth aspect a series of tear-off blisters frangibly attached each to the next, each blister comprising a blister tray, and a flexible peel-off cover for the blister tray, the peel-off cover and the blister tray being attached by re-sealable means, for example an adhesive, which allows reclosing of the blister. This is one particularly advantageous embodiment which is especially useful to help prolong the life of products which may otherwise deteriorate. This applies also to products which may be stored in a container of the present invention, and which may have their useable life extended by storage of the container within an exterior protective pack such as a blister pack. It is desirable that a peel-open tab is provided on each blister to facilitate peeling open of the pack. The tabs may be on the peel-off corner or the tray.

In a fifth aspect the invention provides a series of tear-off pouches formed by sealing two layers of flexible material to each other about discrete areas, the pouches frangibly attached each to the next, each pouch being provided with a tear-open notch to facilitate tearing open of the material forming the pouch. The tear-off notch allows the pack to ripped open more easily so a user can access the contents.

The invention in a sixth aspect also relates to a combination package, the combination package comprising a container of the present invention as described above and an outer pack, the outer pack being a blister- or pouch-type pack. Suitably the blister- or pouch-type pack is in the form of a strip or array pack. This is one particularly convenient method of packaging a container according to the present invention.

The term "v-shaped" as used herein in relation to the present invention includes the convergence of two surfaces towards a point of coincidence, for example an apex, and includes surfaces which are curved and surfaces which do not converge at the same rate towards the point of coincidence.

The term "ramped" includes both planar and curved sloped surfaces. It also includes those surfaces where the rate of incline changes.

The term "blister" as used herein refers to a pack arrangement with at least two layers of material, one layer having (an array of) depressions formed in it and within which a container of the invention can be at least partially placed and a second layer for sealing to the first to close the pack about the, or each, depression.

The term "pouch" as used herein includes a pack arrangement with a layer of material each side of the container, the layers being joined to each other to create a pocket or pouch (similar to a sachet) within which the container is held. The pouch is normally created by heat sealing (or welding) the layers to each other about the container.

The term "strip" as used herein to refer to packaging includes a series of blisters wherein each container holding compartment (or "blister") is frangibly connected to each of the other compartments to which it is attached, or a series (lines) of pouches which are frangibly connected one to the next. A strip is usually a single series of blisters or pouches. It will be appreciated that a series of blisters or pouches may be provided as an array such as described below.

BRIEF DESCRIPTION OF THE DRAWINGS

FIG. 3 is a top plan view of the container of FIG. 1;

FIG. 4 is an underneath plan view of the container of FIG. 1 (showing the view through the open base);

FIG. 5 is a cross-sectional view of the container of FIG. 1 along the line A—A indicated in FIG. 3;

FIG. 6 is a cross-sectional view of the container of FIG. 1 along the line B—B of FIG. 3;

FIG. 9 is an enlarged partial cross-sectional view of the container of FIG. 1 (along the line A—A of FIG. 3) showing the cap and nozzle of the container in larger dimensions;

FIG. 10 is an enlarged partial cross-sectional view of the container of FIG. 1 (along the line B—B of FIG. 3) showing the cap and nozzle of the container in larger dimensions;

FIG. 12 shows a perspective view of a container provided with a nozzle assembly of the invention having been filled (with a sealed base end);

FIG. 13 is a perspective view of the container of FIG. 12, the cap having been broken off from the container body;

FIG. 14 is a perspective view of the container of FIG. 12, the cap having been reversed and replaced (snap-fitted) on the container;

FIG. 27 is an underneath plan view of another point of sale array again having a different array of blisters;

FIG. 28 is a side elevational view of the point of sale array of FIG. 27;

FIG. 32 is diagrammatic representation of a point of sale array showing a container of the present invention in each compartment of the pack, the seal (closing) area about the container being shown with hatched lines;

FIG. 33 shows a side part-sectional view of the arrangement of FIG. 32 where the array is a pouch pack array;

FIG. 34 shows a side part-sectional view of the arrangement of FIG. 32 where the array is a blister pack array;

DETAILED DESCRIPTION OF EMBODIMENTS OF THE INVENTION

Certain embodiments of the present invention will be described below with relation to the above Figures.

Figure 1:
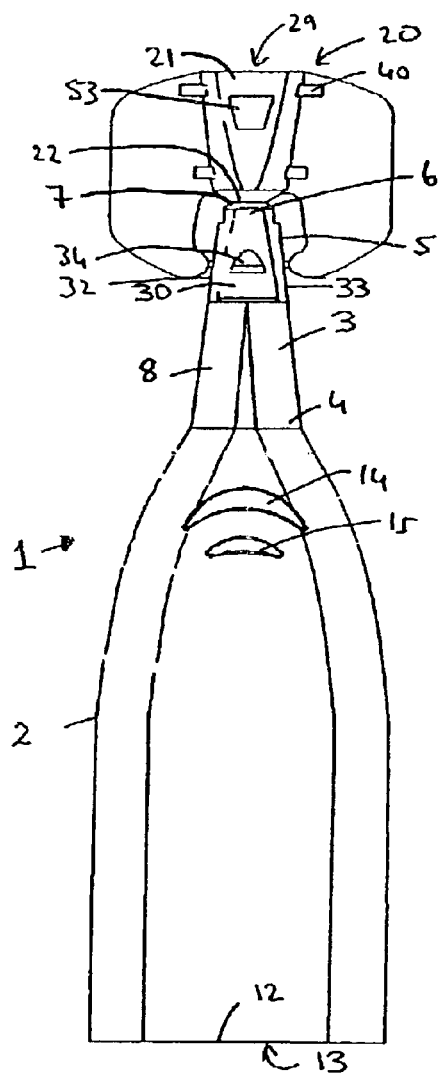
FIG. 1 is a front elevation of (an unfilled) container (with an open base) which incorporates features of the first and second aspects of the present invention.
Figure 19:
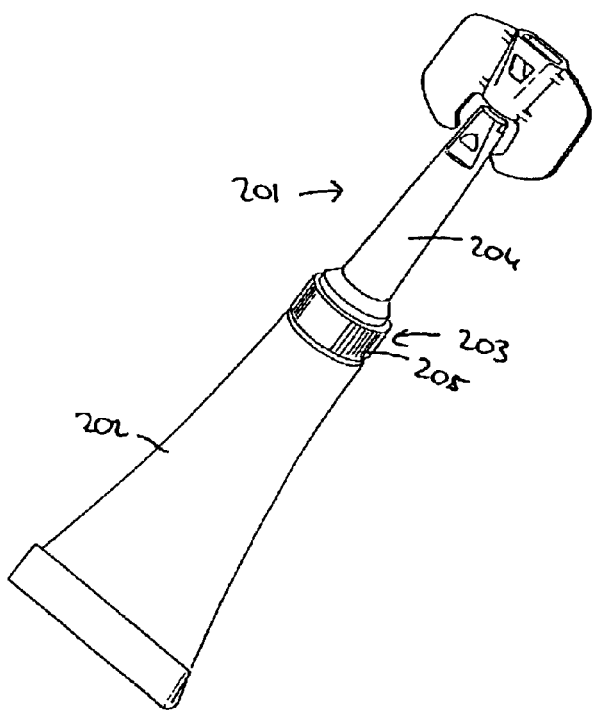
FIG. 19 shows a perspective view of a nozzle assembly of the present invention for attachment to an existing container, which has been attached to a container tube.

FIG. 1 shows a container 1 of the present invention, having a nozzle assembly (comprising a nozzle 3 and a cap 20) of the present invention integrally formed therewith. The container 1 has a hollow container body 2 for receiving and holding product which is placed in the container. An outlet nozzle 3 forming part of the container projects from the container body 2. A first (intake) end 4 (of the nozzle 3) is located on the container body 2, and in the embodiment illustrated, is integrally formed therewith. The outlet nozzle 3 has a second (free) dispensing end 5 with a dispensing opening 6 formed in the dispensing end 5. A mouth or rim 7 is formed on the nozzle 3 about the dispensing opening 6. The outlet nozzle 3 has a nozzle body 8 with a conduit 9 defined therein. The conduit 9 is bounded by an internal surface 10 of the nozzle body 8. The conduit 9 is in communication with the interior 11 of the container body 2 and the dispensing opening 6. A break-off cap 20 is located on the outlet nozzle 3. The break-off cap 20 has a cap body 21 for closing the dispensing end of the outlet nozzle 3. The nozzle 3 and the break-off cap form a nozzle assembly. Alternatively the nozzle 3 and the break-off cap could be formed as a nozzle assembly for attachment to an existing container, for example an aluminium tube container, as shown in FIG. 19. In FIG. 19 the nozzle assembly 201 is attached to a tube 202. The nozzle assembly is for the most part as described below in detail with references to FIGS. 1 to 17 though in the embodiments of FIGS. 1 to 17 the nozzle assembly described is integrally formed with the container. In the embodiment of FIG. 19 the nozzle assembly 201 has at its first intake end 203 of the outlet nozzle 204 a skirt portion 205 which engages a neck of the tube 202. The mode of engagement of the nozzle assembly 201 on the tube 202 is by any suitable method for example screw-threading or snap-fitting. In the embodiment of FIG. 19 the nozzle assembly may be provided as an accessory or attachment adapted for existing containers.

In FIGS. 1–12, 18 and 19, the break-off cap is shown in a first position where the cap body 21 is integrally formed with the outlet nozzle 3 to close the dispensing opening 6 of the outlet nozzle 3. A frangible connection 22 is formed between the nozzle 3 and the cap 20. The frangible connection 22 can be broken to allow removal of the cap (see FIG. 13) and thus opening (uncovering) the dispensing opening 6 on the nozzle 3. It is then possible to dispense product from the container 1. The frangible connection 22 may be formed during integral moulding of the container 1. The container is desirably constructed of a plastics material so that all components may be formed by a single moulding process.

Figure 11:
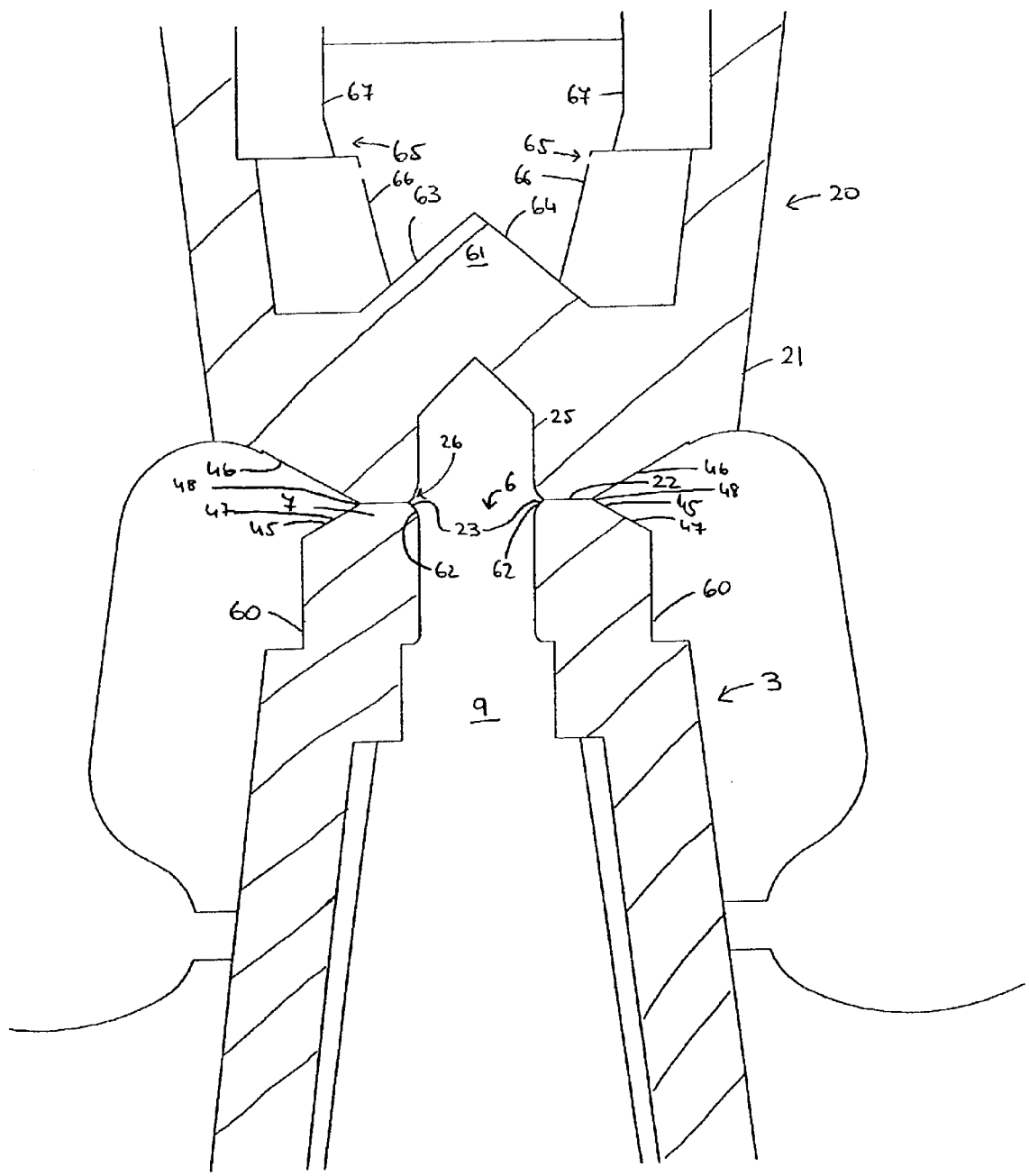
FIG. 11 is a partial view of the view of FIG. 9 enlarged to an even greater extent.
Figure 16:
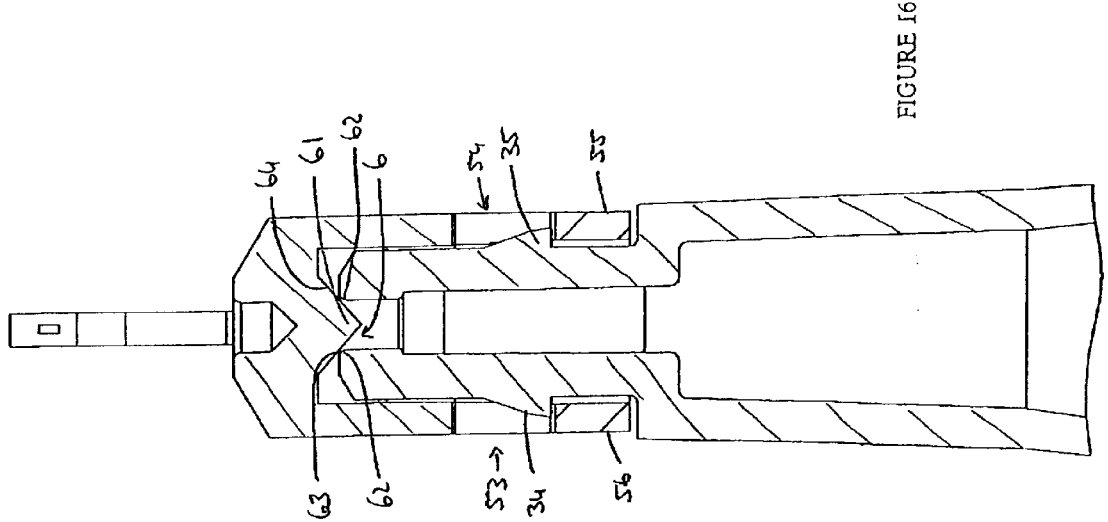
FIG. 16 is a side cross-sectional view of the container of FIG. 14 (with the cap broken off, reversed (inverted) and replaced)

As best seen from the enlarged views of FIGS. 9–11, (and particularly from FIG. 11) an internal annular crotch 23 is formed between the nozzle 3 and the cap body 21 about the dispensing opening 6. The crotch narrows in a radially outward direction (radially outwardly from the conduit 9) providing a generally v-shaped groove or recess at the junction between the cap 20 and the nozzle 3. The weakened junction (the annular crotch 23) between the cap 20 and the nozzle 3 allows the cap 20 to be broken off from the nozzle 3 thus breaking the frangible connection 22. The product can then be dispensed from the container.

As best seen from FIG. 11 the cap body 21 has a recess, groove or housing 25 which is located to the exterior (of the cap body) of the cap. The housing 25 is formed in an external wall of the cap. The provision of housing 25 helps to ensure that no plastics material is inadvertently formed directly across the mouth 6 of the nozzle 3 during moulding of the container. It also allows for ease of break-off of the cap. Desirably the housing 25 has a mouth 26 which is shaped to mate with the mouth 7 (about the dispensing opening 6) of the nozzle 3. Mating is achieved by the frangible connection 22.

The cap body 21 as shown in FIGS. 1–6 is open at its bottom end 12. As best seen from FIG. 4 the container body 2 depends from the nozzle 3 to form a skirt at its bottom end. The skirt is open forming a generally elongate aperture 13 defined by the bottom end 12 of the container body 2. The aperture 13 is the aperture through which the product may be placed in the container. Once the container is filled to the desired level with product, the container bottom may be crimped or (heat-) welded (or indeed closed by any suitable method) along line 14 (see FIGS. 12–14) to seal the contents within the container.

Figure 2:
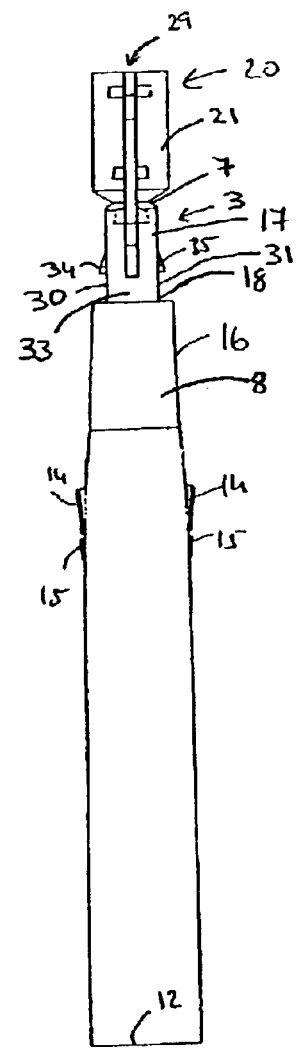
FIG. 2 is a side elevation view of the container of FIG. 1.
Figure 7:
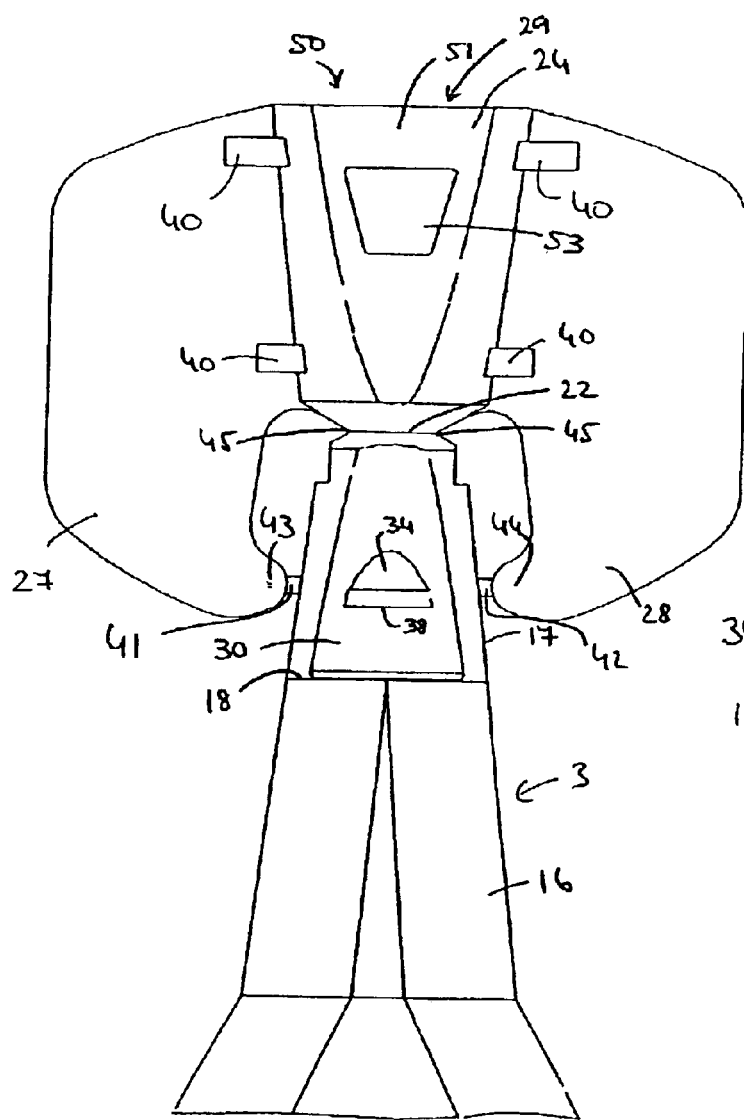
FIG. 7 is an enlarged partial front elevational view of the container of FIG. 1 showing the cap and nozzle of the container in larger dimensions.
Figure 8:
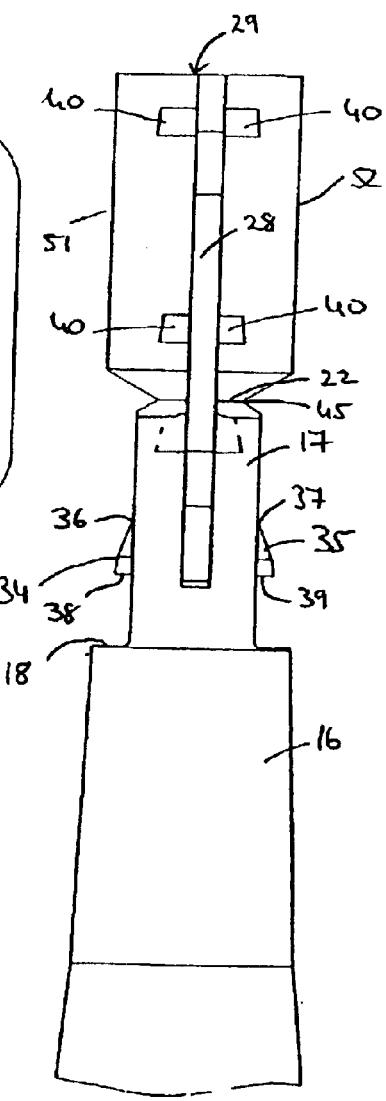
FIG. 8 is an enlarged partial side elevational view of the container of FIG. 1 showing the cap and nozzle of the container in larger dimensions.

To aid gripping of the container 1 by the hand a thumb or finger grip (such as shown in FIGS. 1, 2 and 6) for example in the form of a larger crescent-shaped upstanding grip 14 and a smaller (nested) grip 15 may be provided. The grips 14 and 15 may be provided on opposing sides of the container as seen in FIG. 2.

The nozzle 3 is tapered gradually reducing in dimensions from the container body 2 to the dispensing opening 6. There is also a stepped reduction of the width of the nozzle 3 from the wider portion 16 to the narrower portion 17 which transition occurs at step or rim 18. The step or rim 18 also provides a constriction of the conduit 9.

Two opposing sides of the reduced diameter portion 17 of the nozzle 3, namely opposing sides 30, 31 are flat (straight) while the two opposing ends 32, 33 joining the flat sides 30, 31 are curved.

Each straight side 30, 31 has, formed thereon, a projection respectively labelled 34, 35. The projections 34, 35 taper from respective (upper) positions 36, 37 where they are flush with the reduced diameter portion 17, downwardly and outwardly. The projection 34, 35 end in respective rims or edges 38, 39.

The cap 20 has a shape which resembles a wing nut having a central flat-sided oval shaped narrowing gradually toward its upper end portion 24 forming part of the cap body 21, to which are attached wing shaped grips, which are respectively labelled 27, 28 (see for example FIG. 7) on opposing sides of the flat-side oval portion 24. Optional reinforcing tabs or ribs 40 are provided to strengthen the junction between the flat-sided oval portion 24 and the wings 27, 28.

To reinforce the (inverted) attachment of the break-off cap 20 to the nozzle 3 two further frangible connections 41,42 are integrally formed one between each of respective lugs 43, 44 on the wings 27, 28 and the exterior of the nozzle 3.

The break-off cap 20 is held in an inverted position on the outlet nozzle before it is broken off. In this arrangement an outer surface, namely the surface of the recess or groove 25 closes the dispensing opening on the container. The break-off cap is reversible so that when broken off, (see FIG. 13) the cap may be inverted for subsequent replacement onto the container (see FIG. 14).

In this regard it is worth noting that the cap 20, and in particular the generally flat-sided oval portion 24 (see FIG. 7), forms a housing 29 into which at least a portion of, and in particular the dispensing end 5 of the nozzle 3 is insertable. As can be seen from the Figures the generally flat-sided oval portion 24 matches the profile of the reduced circumference portion 17 of the nozzle 3 and snugly overfits it. In particular the generally flat-sided oval portion 24 comprises a housing 50 defined by two opposing side walls 51, 52 in each of which are formed one of two windows or apertures respectively labelled 53, 54. The windows or apertures 53, 54 are designed to be snap-fit engagable with the projections 34, 35. The windows 53, 54 are cut-out portions of the side walls 51, 52 and are generally of rhombehedral shape. When the cap 20 is snap-fitted onto the nozzle 3, (as best seen from FIGS. 14 and 16) lower (transverse) wall portions 55, 56 engage underneath the rims 38, 39 of the (inverted) cup-shaped projections 34, 35. As best seen for example from FIGS. 3, 12 and 13 the shape of the housing 29 reflects that of the nozzle with the two flat sides 51, 52 which are joined by curved ends 57, 58. The mouth 59 of the housing 50 is thus of an oblong shape, and may be considered as a straight or flat-sided oval shape.

Figure 15:
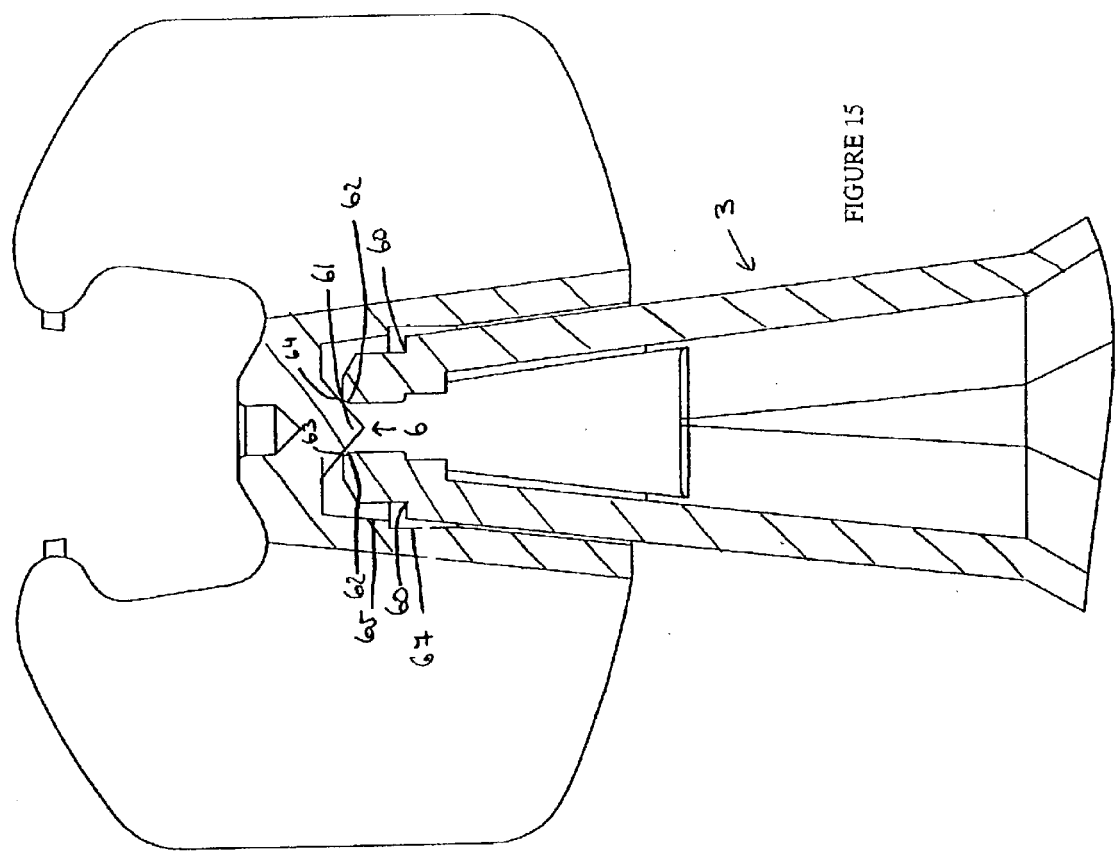
FIG. 15 is an enlarged front sectional view of the nozzle and cap of the container of FIG. 14 (with the cap broken off, reversed (inverted) and replaced)
Figure 17:
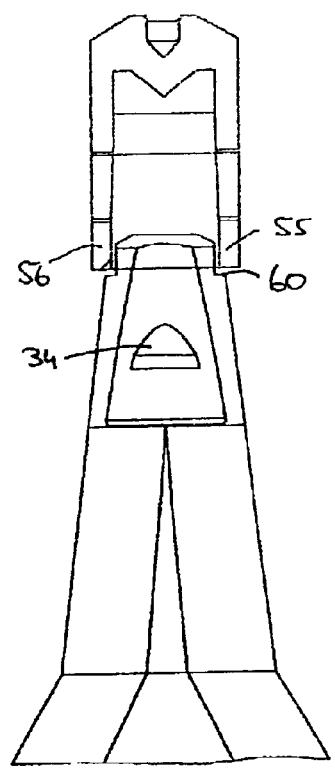
FIG. 17 shows a part-sectional view of a nozzle assembly of the present invention wherein the cap has been broken-off, reversed and incorrectly aligned for replacement on the nozzle.

A front sectional view of the container of FIG. 14 is shown in an enlarged partial view in FIG. 15. In FIGS. 11 and 15 it can be more clearly seen that the nozzle 3 has at its dispensing end 5 and on two opposites side of the mouth 6 two recess portions 60. The recess portions 60 form a seat for a seat engaging portion 65 on the cap. The seat-engaging portion 65 on the underside of the cap has two parts, a first part 66 (see FIG. 11) which is a first seat-engaging-portion which co-operates with tabs 68 (see FIGS. 12 and 13) on the nozzle 3 and a second seat-engaging-portion 67 which is dimensioned to engage the first seat-engaging-portion 66. The relative positioning of the seat-engaging-portion 66 and the tabs 68 ensure the desired orientation of the cap and the nozzle (and thus the container) is achieved, as the cap and the nozzle will not mate if the seat-engaging-portion 66 and the tabs 68 abut. The seat-engaging-portion 66 and the tabs 68 abut if the cap is incorrectly orientated. The cap may be correctly guided onto the nozzle by interaction of the tabs 68 and the seat-engaging portions 66 and 67, and is then seated on the nozzle. Incorrect alignment is shown in FIG. 17. In the incorrect alignment of FIG. 17 lower wall portions 55,56 engage recess portions 60 so that recess portions act as stops preventing the cap from being placed over the nozzle.

The cap 20 when in place on the nozzle is held thereto by inter-engagement of the projections 34, 35 in the windows or apertures 53, 54 as shown in FIG. 14 where the cap 20 has been snap-fitted to the nozzle 3. In the closed configuration (see FIGS. 11, 15 and 16) projecting portion or projection 61 (which is generally conical in shape and thus triangular in cross-section) protrudes into the conduit 9 engages the mouth thereof and providing a reliable seal for the container. It will be appreciated that due to the provision of the crotch or annular recess 23 between the nozzle 3 and the cap 20, the shoulder portions 62 of the nozzle inside the mouth 6 abut exterior walls 63, 64 of the conical projection 61. The projection 61 may alternatively be of any shape suitable to provide a seal for the dispensing opening 6. There is thus provided a reliable sealing arrangement so that even if remnants of frangible connection 22 were to be left at the top of the nozzle, these will not interfere with the closing action of the cap. In particular, and as best seen from the enlarged view of FIG. 11 the shoulder portion 62 can be considered to be a ramped surface running from the internal surface of the nozzle defining the conduit, to the mouth of the nozzle. The ramped surface 62 is annular and is generally frusto-conical in shape (in particular narrowing in diameter down the nozzle 3). The conical shaped projecting portion 61 and the ramped surface act as a plug and socket type arrangement, the projection portion 61 plugging the dispensing opening of the nozzle 3 by engaging the ramped surface 62.

Figure 18:
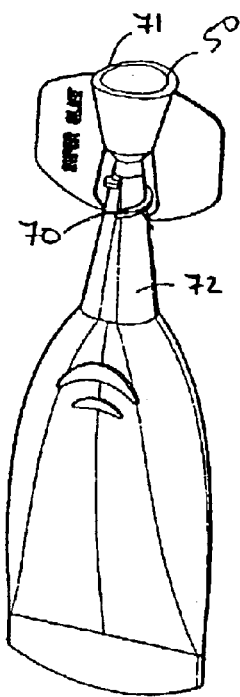
FIG. 18 is a perspective view of a container incorporating a nozzle assembly of the present invention having inter-engaging formations on the cap and the nozzle in the form of screw-threads.

Alternatively as is shown in FIG. 18 the inter-engaging formations may be screw-threads such as the thread 70 of FIG. 18 with a corresponding thread within the housing 50. In this embodiment the cap 71 which is similar in construction to cap 20 does not have the oblong shape of the mouth of the cap 20. As the cap 71 and the nozzle 72 interengage by means of reciprocal screw-threads (which necessitates relative rotation), the nozzle and the housing 50 of the cap are generally conical in shape. The cap 71 may be otherwise the same in construction to cap 20.

As seen in the Figures and in particular the enlarged view of FIGS. 7–11, there is also formed an external annular crotch 45. The crotch 45 narrows in a radially inward direction (radially inward toward the conduit 9). The crotch 45 is formed on the exterior of the container between the cap 20 and the nozzle 3 (in particular the mouth 7 of the nozzle 3). In particular the crotch 45 is formed by two (radially) inwardly converging surfaces—namely the outer surface 46 on the cap 20 and the outer surface 47 on the nozzle 3. The surfaces 46 and 47 converge to form an apex 48 of the crotch. There are thus provided two opposing crotches which are located on either side of the frangible connection 22. This double crotch arrangement allows for ease of removal of the cap 20. The crotch 45 is v-shaped. The container of the invention is suitable for use with many products including in particular liquids and gels. The container will normally be designed to hold a relatively modest volume for example from about 0.5 to about 5.0 grams, such as about 1 gram or about 2 grams. The container may be crimped (heat-welded) at any part along its length (and above the fill-level in the inverted position) and bottom end 12 may be of a desired shape to facilitate ease of closure of the container. For light-sensitive materials opaque materials may be used to construct the container.

Figure 20:
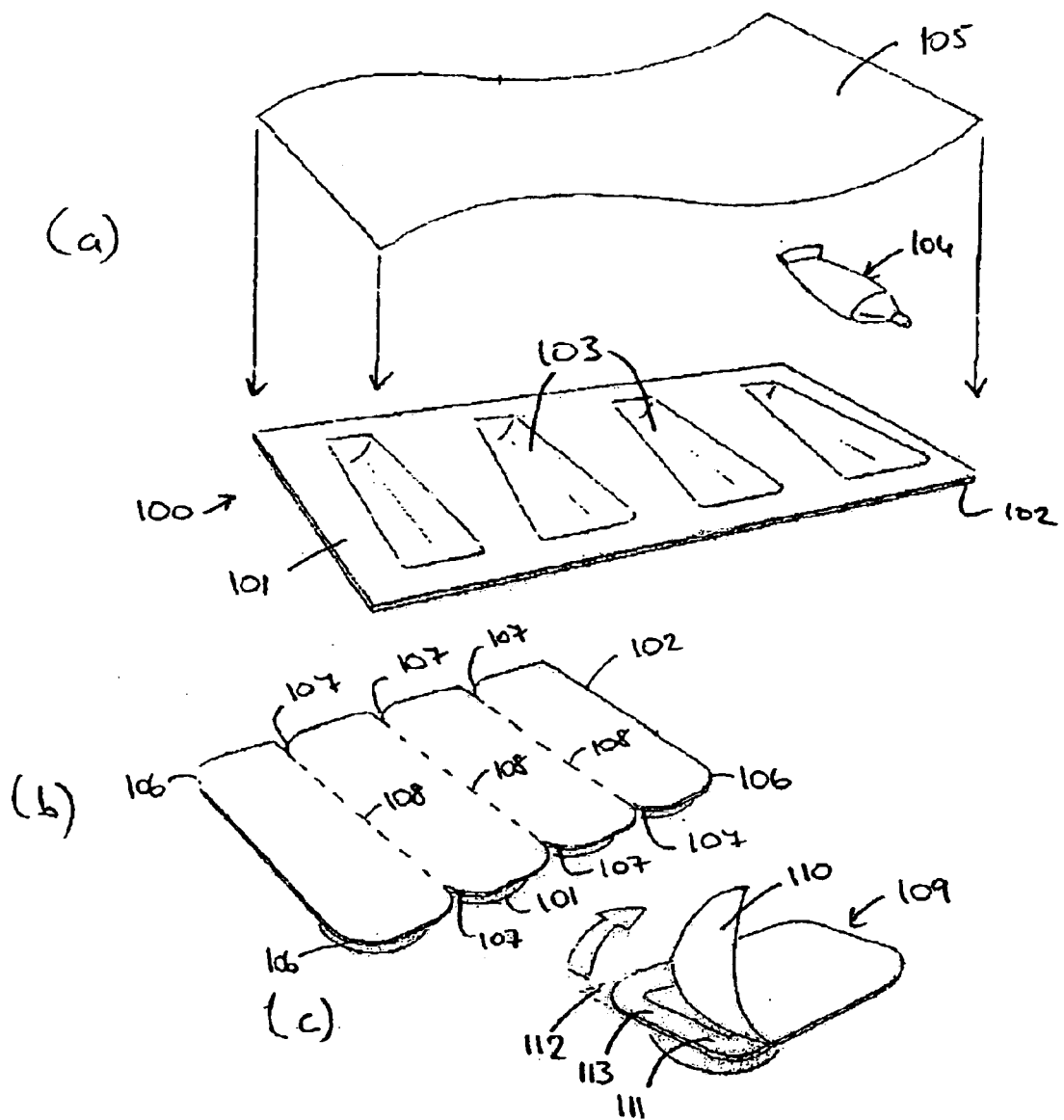
FIGS. 20(a)–(c) show a blister-pack arrangement of the present invention; (a) is an exploded perspective view; (b) is a perspective view of the closed configuration and (c) is a perspective view of a single blister, with the flexible sealing layer partially peeled away.

FIG. 20 shows a blister pack array of the present invention in a pre-form assembly. The blister pack 100 is shown in exploded view. The blister pack comprises a semi-rigid material, such as aluminium in the form of a preform 101. The preform 101 is a sheet 102 of deformable material such as aluminium material into which have been pressed (or punches) depressions or blisters 103. Each of the blisters 103 is shaped to receive and at least partially contain a container 104. Only one container 104 is shown in FIG. 20, though it will be appreciated that a container 104 may be placed in each of the blisters 103. The container 104 shown in FIG. 20 is diagrammatically drawn for the purposes of illustration only. In practice a container according to the present invention (as described above) may be placed within the blister pack.

To complete the package a flexible sheet of material 105 such as a foil, for example an aluminium foil, may be used. The sheet 105 corresponds generally in shape to the preform 101. The sheet 105 is attached to the preform. Normally, such attachment is achieved by heat and pressure sealing of the materials used. However in order to achieve re-sealing, resealing means for example a suitable adhesive which retains sufficient bonding capability to allow re-sealing of the pack could be used. This secures each container 104 within the pack, one in each blister 103. The person skilled in the art will appreciate how to assemble such a blister pack for example by the materials described or by cold form methods.

As shown in FIG. 20(b) the sheet 102 has been sealed to the preform 101. The sheet 102 (and the preform 101 where necessary) have been cut to a desired shape with rounded edges 106 and a series of cut-out portions or crotches 107. A crotch 107 is provided on either side of the frangible connection 108. The frangible connection 108 is machined into the pack (for example as a score line or as a series of perforations) and allows for breaking-off of a single "blister" 109 (as shown in FIG. 20(c)) thus creating a tear-off strip form of blister packaging. A single container 104 is contained within each blister 109. The blister pack shown in FIG. 20(b) is a single strip of blister. It will be appreciated that multiple strips or arrays are also possible and are described below.

The crotches 107 on either side of the frangible connection 108 allow for ease of tear-off or break-off of successive blisters. It is intended that in a point of display array or strip each blister is easily detachable from the next thus allowing the blisters to be sold individually while being conveniently arranged for display.

As shown in FIG. 20(c) the blister is formed with a discrete blister cover 110 which may be peeled back from the blister tray 111. The sheet 110 has a corner portion 112 (which is shown in dashed outline in the closed position in FIG. 20(c)) which protrudes beyond the blister tray 111. This allows the blister cover 110 to be peeled back from the rim 113 of the blister tray 111. The corner portion 112 thus acts as a pull-off tab, allowing the cover 110 to be easily pulled off manually. The blister cover 110 may be resealable to the blister tray 111. This may be achieved by using a suitable adhesive which does not loose its tackiness to hold the blister cover 110 to the blister tray 111.

Figure 21:
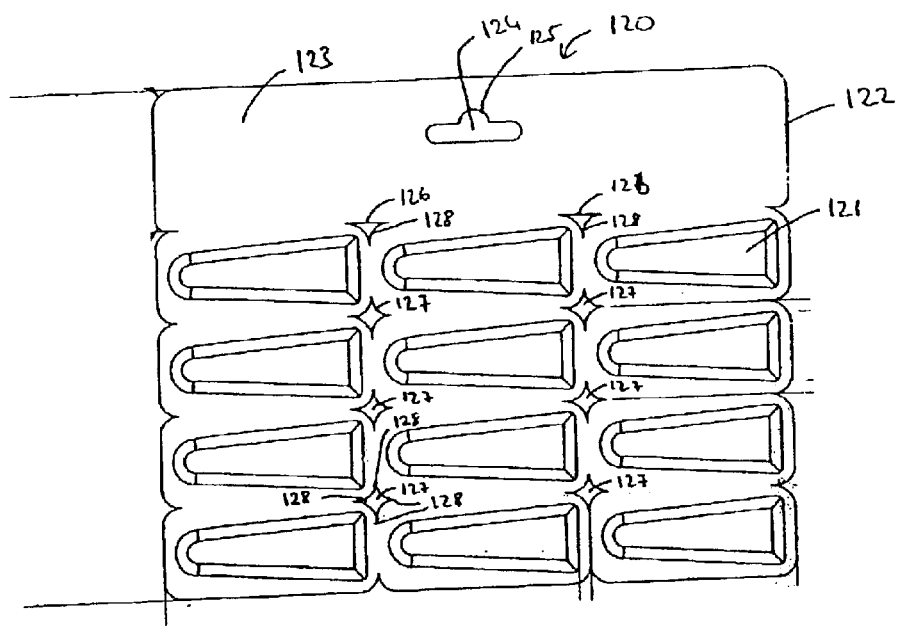
FIG. 21 shows an underneath plan view of a series of blisters arranged in a point of sale array.

A point of sale display blister pack array 120 is shown in FIG. 21. In the array 120 there are four rows and three columns in a 4×3 arrangement. The blisters 121 are provided in a preform 122. Also provided on the preform 122 is a planar tab 123 which has defined therein an elongate aperture 124 which extends upwards in a further groove 125 to provide means for hanging the point of display array 120 on a display hook (or hanger). The tab 123 may be integrally formed with the blister pack, or may be attached separately. If not integrally formed the tab can be constructed or other materials such as cardboard etc. To facilitate removal of individual blisters, a series of apertures scores or cut-outs and the like may be created in the preform 122. The cut-out consist of two different types of apertures respectively labelled 126 and 127.

The apertures 126 are generally triangular in shape, forming a cut-away portion or crotch 128 between successive blisters 121 in the same row. Where blister 121 occurs at a position in the array where it must be separable from a blister directly beneath it in the column, and simultaneously any adjacent blisters in the same row, a star-shaped aperture 127 is provided. Each "leg" or apex of the star provides a crotch 128. Frangible connections may be provided (for example simultaneously with sealing the container closed) across and down the array between the rows and the columns to form a grid or array of blisters each of which are frangibly connected to the other. The frangible connection may be provided by partial cut away along a line joining the apertures 126, 127 in the row direction or in the column direction.

Figure 22:
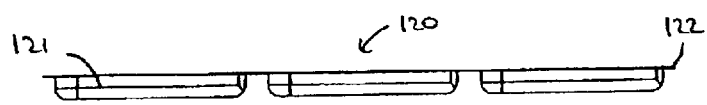
FIG. 22 shows a plan view of the point of sale array of FIG. 21 from one end thereof.
Figure 23:
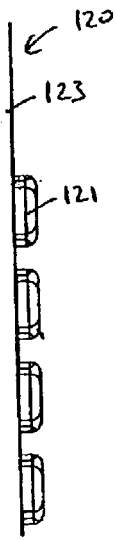
FIG. 23 is a plan view of the point of sale array of FIG. 21 from one side thereof.
Figure 24:
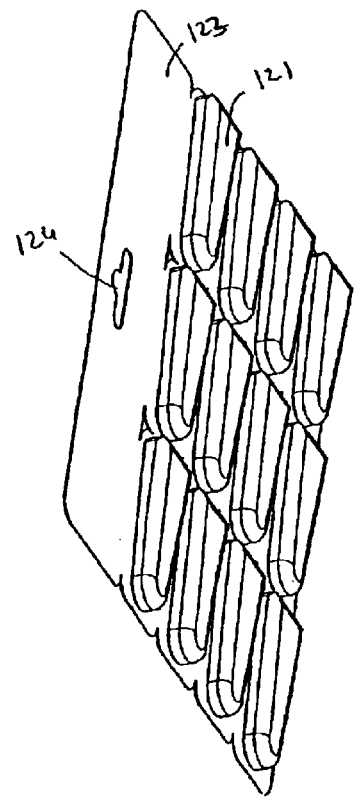
FIG. 24 is a perspective view of the underneath side of the point of sale array of FIG. 21.

An end view of the array of FIG. 21 is shown in FIG. 22. A side-view thereof is shown in FIG. 23. A perspective view is shown in FIG. 24.

Figures 25, 26:
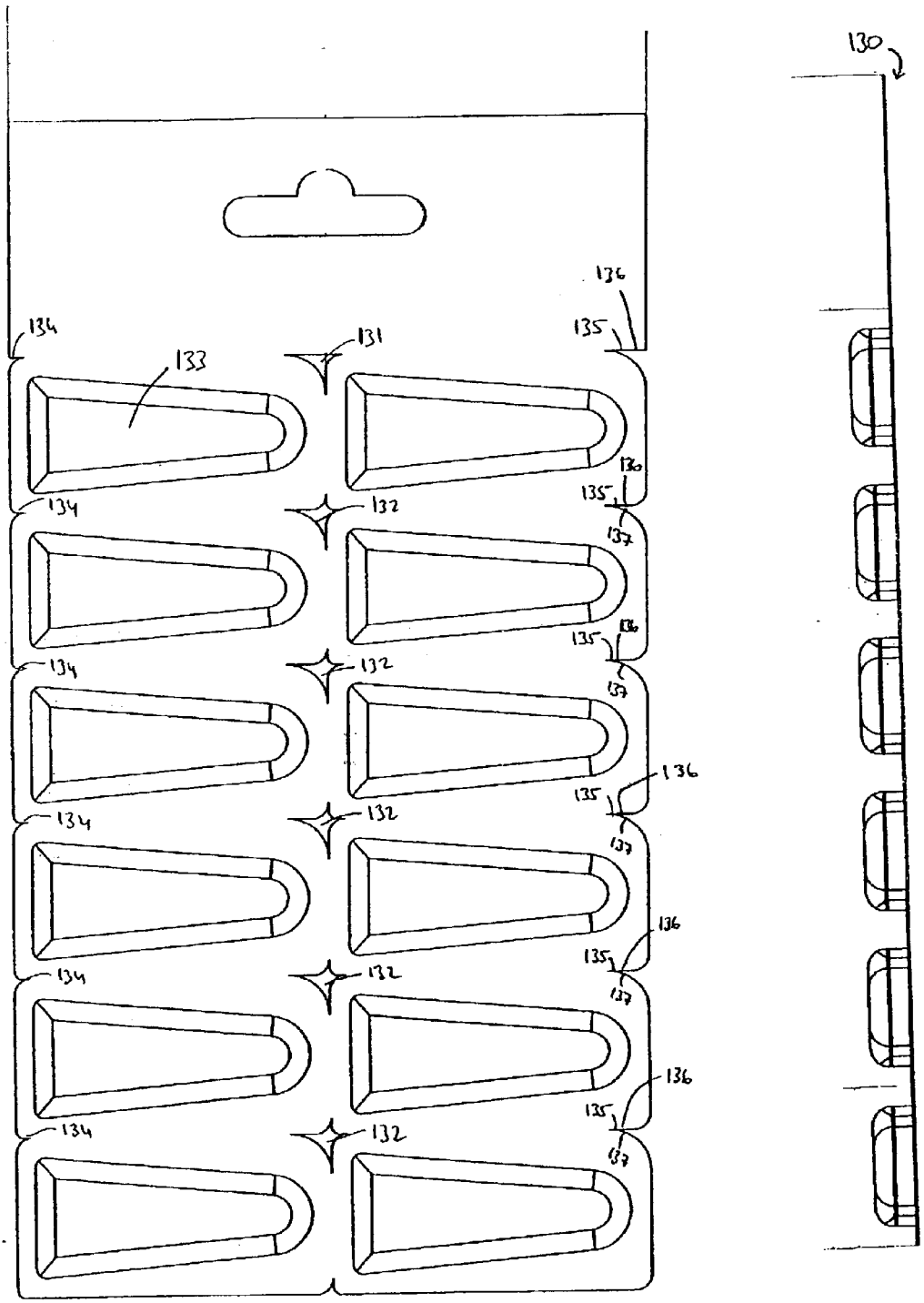
FIG. 25 is an underneath plan view of an alternative series of blisters arranged in a point of sale array, and having a different array of blisters (as compared to the array of FIG. 21)
FIG. 26 is a side elevational view of the point of sale array of FIG. 25.

FIG. 25 shows an underneath (plan) view of a point of sale display array 130 which is very similar to the array of 120 of FIG. 21. The array 130 has six rows and two columns defining a 6×2 arrangement. In this arrangement a generally triangular shaped aperture 131, and general star-shaped apertures 132 are provided again to allow for ease of removal of the blister 133. The break away facility may be provided by scores, slits and/or apertures of alternative shapes to those described. Again cut-away portions or crotches 134 are provided along one side of the array 130. On the other side 135 a series of cut-away portions are also provided to allow for ease of removal. The cut-away portions 135 have one generally straight upper side 136 and a lower corner side 137 which converge inwardly toward a line along which a frangible connection may be provided. This arrangement also allows for ease of removal of the individual blister. A side elevational view of the array 130 is shown in FIG. 26.

A similar array 140 is shown in FIGS. 27 and 28, although in this case five rows and two columns are provided in a 5×2 arrangement of blisters 141. Again cut-away portions are provided for ease of removal of individual blisters 141. Certain materials useful in the construction of the blister pack include a laminate consisting of the following 3 layers: 30 $\mu$m paper/12 $\mu$m polyester/20 $\mu$m polyvinyl chloride. The preform may be constructed of the following four layered laminate: 60 $\mu$m polyvinylchloride/25 $\mu$m polyamide/60 $\mu$m aluminium/60 $\mu$m polyvinyl chloride. It will be appreciated by those skilled in the art that many sorts of suitable materials can be used.

Figure 29:
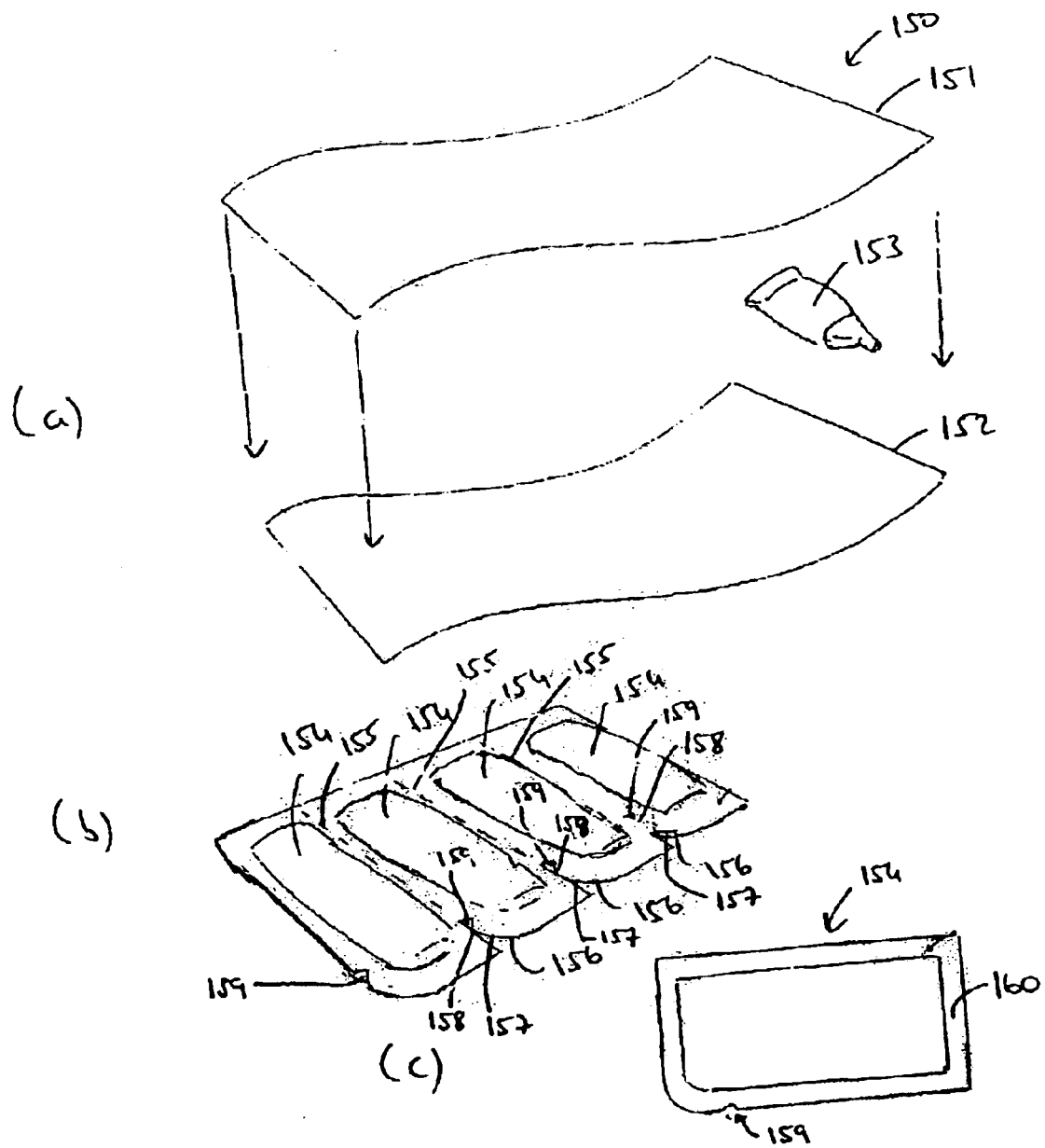
FIGS. 29(a)–(c) show: (a) an exploded perspective view of a pouch packaging (prior to assembly) according to the present invention; (b) an elevational view of a series of (four) pouches arranged in a tear-off strip; (c) a plan view of a single pouch.

FIG. 29 shows various views of a pouch assembly 150 of the present invention. FIG. 29(a) is an exploded view of an arrangement for creating a pouch strip 150 of the present invention. In particular the assembly comprises two opposed sheets of flexible material namely an upper sheet 151 and a lower sheet 152 between which is disposed a container 153. Like the container 104 of FIG. 20, the container 153 is shown for diagrammatic purposes. It is desirable that the container 153 is a container according to the present invention. The upper and lower sheets 151, 152 are each generally rectangular in shape and of the same size. The sheets 151, 152 may be made of an aluminium material, such as for example a laminated aluminium foil.

To create individual pouches 154 the two sheets 151, 152 are brought together and joined to each other about the container 153. In the arrangement shown in FIG. 29(b) four containers 153 have been sealed within four pouches, one in each pouch 154. Each container 153 is then in a individual sachet, the sachets being connected in a tear-off strip arrangement.

In the blister pack arrangement of FIG. 20 while the sheets 151, 152 are being attached to other about the containers 153, they may also be provided with frangible connections 155 and cut away portions 156 at the same time. The sheets 151, 152 may be adhered to each other. Alternatively they may be welded or fixed together by any other suitable method.

The cut-away portions 156 allow for ease of removal of the individual pouches 155 from each other. In particular the cut-away portions 156 comprise a crotch portion 157 which is generally v-shaped. The crotch portion 157 converges to the point of convergence 158 where the crotch portion terminates. There is then formed a further v-shaped recess 159 which acts as a tear-open notch when it is desired to (tear) open the pouch to remove the container inside for use. This is achieved by manually applying a shear or tear-open force at the tear-open notch. The pouch tears allow across to the container inside. An individual pouch 154 is shown torn away from the strip of pouches in FIG. 29(c). The sealed (joining) area about the container can be seen as peripheral rim 160.

Figures 30, 31:
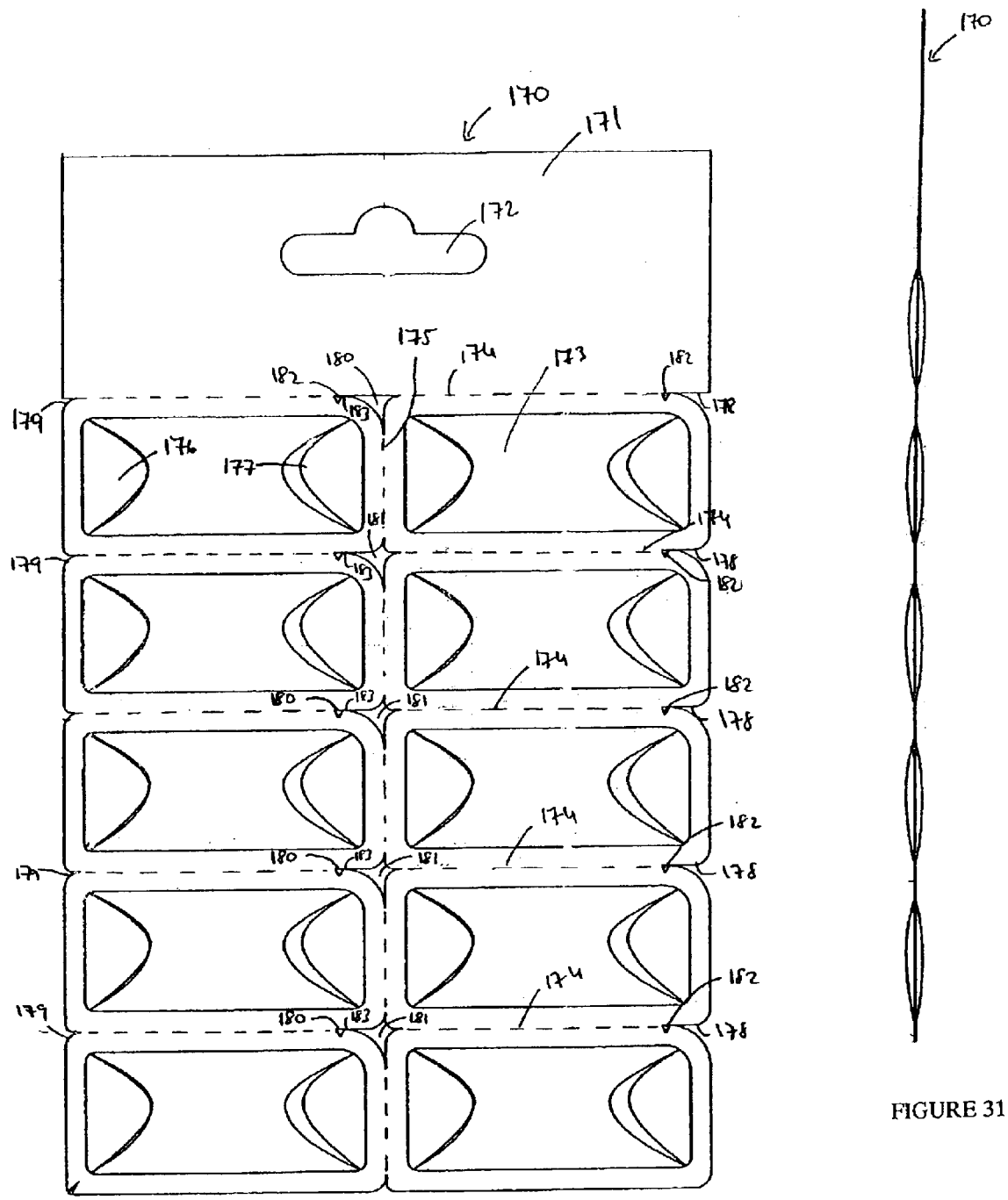
FIG. 30 shows a top plan view of a point of sale pouch array.
FIG. 31 shows a side elevational view of the array of FIG. 30.

A point of sale array 170 of pouch packs 154 are shown in FIGS. 30 and 31. The arrangement shown has five columns and two rows in a 5×2 arrangement. The array 170 has a tab 171 in which is defined an aperture 172 which allows array of pouches to be hung on a hook in a manner described previously above.

In the array 170 each of the pouches 173 is (transversely) frangibly connected to part of the array above and below by transverse frangible connections 174. The pouches 173 may be separated from each other by a longitudinal frangible connection 175. Each pouch 173 may be turn or broken away as it frangible from all other blisters to which it is connected.

The ends 176, 177 are not directly supported by the container inside and thus flatten down to provide dished or flattened ends 176, 177 which are generally u-shaped, the shape of the container (the contents of the pouch) is taken up by both sheets 151, 152 as can be seen from the side view of FIG. 31.

As described above for FIG. 29, cut-out portions 178, generally in the form of v-shaped crotches, are provided on one end of the array between each of the pouches 173, and between the uppermost blister and the tab. On the opposing side of the array and along the frangible connection 174 cut-out portions or crotches 179 are also provided to allow for ease of the attachment of blisters. Between the uppermost row of pouches and the tab 171 an aperture 180 is provided and is generally triangular in shape with three apexes. The apertures 181 between subsequent rows are generally star-shaped with four apexes.

Each of the apertures 180, 181 extends along the frangible connection 174 and terminates at a point of convergence 183. A tear-open notch 182 is then provided for each of the pouches 173 on the other side of the point convergence 183. FIG. 31 is a side elevational view of the pack of FIG. 30.

FIG. 32 is a diagrammatic representation, in part-sectional view, of a blister pack or a strip pouch according to the present invention in which a container 190 is located in each of blisters or each of the pouches. The container 190 is a container according to the present invention having an internal annular crotch to allow break-off of the cap 191 as described above. The hatched area 192 indicates the areas sealed between the two flexible sheets sealed together about the container, where the array is a pouch array, or the area between the preform and the flexible sheet sealed together where the array is a blister array.

The container 190 differs from the containers described previously in a number of relatively minor respects. These include rims or wings 193 provided on opposing sides of the container which allow for ease of manual handling. The cap 191 has internal threads 194 which engage with reciprocal threads 195 on the nozzle of the container. The cap 191 also has two opposing wings or grips 196 which allow for ease of handling of the cap 191. A side, part-sectional view of a pouch arrangement shown in FIG. 32 and shown in FIG. 33. The blister array is shown in side, part-sectional view in FIG. 34.

Figure 35:
FIGS. 35 shows a point of sale blister pack array according to the present invention with exemplary product information printed on one side of the array.

A point of display array 198 is shown in FIG. 35. The array has three columns and four rows (3×4). As can been seen printed matter 199 has been applied to the flat side of the blister pack.

Methods of preparing the types of packaging described will be known to those skilled in the art. In this respect aprticular mention is made of a method of packaging often referred to as "flow wrapping", "flow pack(ing)" or "tube wrap(ing)". This is a type of packaging which seals in articles. The seal produced on a horizontal or vertical "form-fill-seal" wrapping machine generally associated with wrapping irregular-shaped items (such as candy bars, bakery items, etc.). In general the "form-fill-seal" operation is carried out as follows: a reel (web) or reels of flexible packaging material is formed into a container, filled and sealed in one series of operations to produce a package, containing a predetermined quantity of product.

Form-fill-seal operations (flow packing) can be carried out in three main ways:
(a) a web of material may be formed into a tube which is filled and sealed at intervals;
(b) a web of material may be folded along its length, sealed at intervals to form a series of pouches (sachets) which are then filled and closed; and
(c) a web of material may be thermo-formed to give a series of tray like depressions which are filled, and then sealed by means of a second web.

The words "comprises/comprising" and the words "having/including" when used herein with reference to the present invention are used to specify the presence of stated features, integers, steps or components but does not preclude the presence or addition of one or more other features, integers, steps, components or groups thereof.

What is claimed is:

1. A dispensing pack comprising:
(i) a container for holding curable product;
(ii) curable product held within the container; and
(iii) a nozzle assembly, attached to or integrally formed with the container, the nozzle assembly comprising:
  a) an outlet nozzle for dispensing the product having a first intake end for taking up product from the container and a second dispensing end with a dispensing opening formed in the dispensing end and a mouth formed on the nozzle about the dispensing opening, the nozzle comprising a nozzle body with a conduit formed therein defined by an internal surface of the nozzle body, the conduit for communication between the intake end and the dispensing opening; and
  b) a break-off cap comprising a cap body for closing the dispensing end of the outlet nozzle the cap having a housing into which the dispensing end of the nozzle is insertable, the break-off cap having a first position wherein the cap body is integrally formed with the outlet nozzle to close the dispensing opening of the outlet nozzle and is connected thereto by at least one frangible connection, and a second position wherein the frangible connection is broken allowing removal of the cap and thus opening the dispensing opening thereby allowing product to be dispensed through the outlet nozzle;

the cap body and the outlet nozzle having interengaging formations for subsequently securing the break-off cap to the nozzle to close the outlet opening, wherein the interengaging formations are snap-fit formations that are disengageable from the interengaged position by relative rotation of the cap and the container, the nozzle and the cap being shaped so that relative rotation of the cap and the nozzle causes deformation of the cap.

2. A dispensing pack according to claim 1 wherein the nozzle assembly has an internal annular crotch, which narrows in a radially outward direction, formed between the nozzle and the cap body about the dispensing opening, the crotch providing a weakened junction between the cap and the nozzle allowing the cap to be broken off from the nozzle thus breaking the frangible connection comprising:
  a) an outlet nozzle for dispensing the product having a first intake end for taking up product from the container and a second dispensing end with a dispensing opening formed in the dispensing end and a mouth formed on the nozzle about the dispensing opening, the nozzle comprising a nozzle body with a conduit formed therein defined by an internal surface of the nozzle body, the conduit for communication between the intake end and the dispensing opening; and
  b) a break-off cap comprising a cap body for closing the dispensing end of the outlet nozzle, the break-off cap having a first position wherein the cap body is integrally formed with the outlet nozzle to close the dispensing opening of the outlet nozzle and is connected thereto by at least one frangible connection, and a second position wherein the frangible connection is broken allowing removal of the cap and thus opening the dispensing opening thereby allowing product to be dispensed through the outlet nozzle; wherein the nozzle and the cap are shaped so that relative rotation of the cap and the nozzle causes deformation of the cap and allows for its removal" has been deleted.

3. A dispensing pack according to claim 2 wherein the internal crotch is generally v-shaped, being defined on one side by a surface of the cap body and on the other by a surface of the nozzle.

4. A dispensing pack according to claim 3 wherein in a radially outward direction the surfaces of the crotch converge toward the frangible connection.

5. A dispensing pack according to claim 3 wherein the surface on the nozzle defining one side of the crotch runs from the internal surface of the nozzle, or from a position proximate to the internal surface of the nozzle to the mouth of the nozzle.

6. A dispensing pack according to claim 2 wherein one side of the internal annular crotch is provided, at least in part, by a ramped surface running from the internal surface of the nozzle defining the conduit to the mouth of the nozzle.

7. A dispensing pack according to claim 6 wherein the ramped surface is annular.

8. A dispensing pack according to claim 7 wherein the annular ramped surface is of a generally frusto-conical shape.

9. A dispensing pack according to claim 1 wherein the outlet nozzle forms an integral part of a container.

10. A dispensing pack according to claim 1, wherein the container is provided with an external annular crotch, which narrows in a radially inward direction, formed between the nozzle and the cap body and about the dispensing opening.

11. A dispensing pack according to claim 10 wherein the external crotch is generally v-shaped being defined on one side by a surface of the cap body and on the other by a surface of the nozzle.

12. A dispensing pack according to claim 11 wherein the radially inward direction the surfaces of the crotch converge toward the frangible connection to form the apex of the v-shape.

13. A dispensing pack according to claim 12 wherein the surface on the nozzle defining one side of the external crotch runs from an external surface of the nozzle, to a position on the nozzle proximate or at the mouth of the nozzle.

14. A dispensing pack according to claim 1 wherein the container and nozzle assembly are molded as a single piece.

15. A dispensing pack according to claim 1 wherein the container and nozzle assembly takes the farm of a hand-held phiol.

16. A dispensing pack according to claim 15 wherein the phial is constructed of deformable plastics so that it is squeezable.

17. A dispensing pack according to claim 1 wherein the break-off cap is held in an inverted position on the outlet nozzle before it is broken off.

18. A dispensing pack according to claim 17 wherein an outer surface of the cap closes the dispensing opening on the container.

19. A dispensing pack according to claim 18 wherein an outer surface of the cap closing the dispensing opening is an internal wall of a recess or housing formed on the cap, the housing mating with the mouth of the nozzle.

20. A dispensing pack according to claim 19 wherein the break-off cap is reversible so that when broken off, the cap may be inverted for replacement on to the nozzle.

21. A dispensing pack according to claim 20 wherein the formations on the cap for interengaging with the reciprocal interengaging formations on the container being formed on the housing.

22. A dispensing pack according to claim 21 wherein the interengaging formations are formed by one or more projections and one or more corresponding recesses or grooves with which the projections engage.

23. A dispensing pack according to claim 1 wherein the cap has a discharge opening engaging portion for closing the dispensing opening.

24. A dispensing pack according to claim 23 wherein the engaging portion is a projecting portion on the underside of the cap which at least partially projects into the dispensing opening in the closed configuration of the container.

25. A dispensing pack according to claim 24 wherein the projecting portion is shaped to mate with the opening.

26. A dispensing pack according to claim 1 wherein the nozzle and cap are both oblong.

27. A dispensing pack according to claim 1 wherein the nozzle and the cap have co-operating guiding surfaces which guide the cap toward a desired orientation relative to the nozzle.

28. A dispensing pack according to claim 27 wherein the co-operating guiding surfaces are a seat and a seat engaging portion.

29. A combination pack comprising a series of tear-off blisters frangibly attached each to the next, each blister comprising a blister tray, and a flexible peel-off cover for the blister tray, the peel-off cover and the blister tray being attached by resealing means which allows re-closing of the blister and a dispensing pack according to claim 1 within each blister.

30. A combination pack according to claim 29 wherein a peel-open tab is provided on each blister to facilitate peeling open of the pack.

31. A combination pack comprising a series of tear-off pouches formed by sealing two layers of flexible material to each other about discrete areas, the pouches frangibly attached each to the next, each pouch being provided with a tear-open notch to facilitate tearing open of the material forming the pouch and a dispensing pack according to claim 1 within each pouch.

* * * * *